US007564189B2

(12) United States Patent
Murakami et al.

(10) Patent No.: US 7,564,189 B2
(45) Date of Patent: Jul. 21, 2009

(54) FLUORESCENT LAMP, BACKLIGHT UNIT, AND LIQUID CRYSTAL TELEVISION FOR SUPPRESSING CORONA DISCHARGE

(75) Inventors: Masanobu Murakami, Takatsuki (JP); Taizou Ono, Hirakata (JP); Toshihiro Terada, Amagasaki (JP); Hideki Wada, Takatsuki (JP); Hirofumi Yamashita, Morihuchi (JP)

(73) Assignee: Panasonic Corporation, Osaka (JP)

( * ) Notice: Subject to any disclaimer, the term of this patent is extended or adjusted under 35 U.S.C. 154(b) by 148 days.

(21) Appl. No.: 11/244,730

(22) Filed: Oct. 6, 2005

(65) Prior Publication Data

US 2006/0076893 A1 Apr. 13, 2006

(30) Foreign Application Priority Data

| | | | |
|---|---|---|---|
| Oct. 13, 2004 | (JP) | ............................ | 2004-298724 |
| Oct. 13, 2004 | (JP) | ............................ | 2004-298725 |
| Nov. 12, 2004 | (JP) | ............................ | 2004-328775 |
| Nov. 12, 2004 | (JP) | ............................ | 2004-328776 |

(51) Int. Cl.
*H01J 11/00* (2006.01)
*H01J 61/06* (2006.01)
*H01J 65/00* (2006.01)

(52) U.S. Cl. ........................ 313/607; 313/234; 313/567

(58) Field of Classification Search ................. 313/607
See application file for complete search history.

(56) References Cited

U.S. PATENT DOCUMENTS

| | | | | |
|---|---|---|---|---|
| 5,211,128 | A * | 5/1993 | Katoh et al. ................ | 116/288 |
| 5,382,879 | A | 1/1995 | Council et al. | |
| 5,514,934 | A * | 5/1996 | Matsumoto et al. ......... | 313/607 |
| 2001/0016252 | A1* | 8/2001 | Nagamoto et al. .......... | 428/209 |
| 2003/0198038 | A1* | 10/2003 | Choi et al. .................... | 362/31 |
| 2005/0134183 | A1* | 6/2005 | Park et al. ..................... | 315/58 |

FOREIGN PATENT DOCUMENTS

| | | | |
|---|---|---|---|
| JP | 2003-017005 | | 1/2003 |
| JP | 2003257377 | * | 9/2003 |
| KR | 2003067127 | * | 8/2003 |

* cited by examiner

*Primary Examiner*—Toan Ton
*Assistant Examiner*—Britt Hanley

(57) ABSTRACT

A fluorescent lamp including a glass bulb that is in a shape of a tube. External electrodes are formed as conductive layers each of which covers an outer surface of the glass bulb at an end thereof. Metal members in a shape of a cap are respectively connected to the external electrodes by covering at least part of the external electrodes. The metal members are formed such that rims of the metal members recede from a center of the glass bulb in the tube axis direction a distance L than rims of the external electrodes.

20 Claims, 19 Drawing Sheets

FLUORESCENT LAMP, BACKLIGHT UNIT, AND LIQUID CRYSTAL TELEVISION FOR SUPPRESSING CORONA DISCHARGE

This application is based on application No. 2004-298724, No. 2004-298725, No. 2004-328775, and No. 2004-328776 filed in Japan, the contents of which are hereby incorporated by reference.

BACKGROUND OF THE INVENTION (1) Field of the Invention

The present invention relates to a dielectric barrier discharge lamp that includes external electrodes that are formed at both ends of a glass bulb.

(2) Description of the Related Art

In recent years, as the liquid crystal televisions have become widespread, the demand for the direct-below-type backlight units (hereinafter referred to as LCBL units), which are mounted in the liquid crystal televisions, has increased as well.

Currently, a typical light source of a LCBL unit is a plurality of cold-cathode tube lamps. However, another replacing light source is searched for. One reason for this is that as many high-frequency electronic ballasts as there are cold-cathode tube lamps are required to light the lamps.

When this problem is taken into consideration, the dielectric barrier discharge lamps are suitable for the light source since they require only one high-frequency electronic ballast when they are lighted. For example, 16 number of dielectric barrier discharge lamps may be used suitably as the light source of a LCBL unit.

As shown in FIG. 1, a conventional dielectric barrier discharge lamp 1 is composed of a glass bulb 3 that is a discharge vessel in a shape of a tube, a phosphor 5 that is applied onto an inner surface of the glass bulb 3, mercury 7 that is sealed in the glass bulb 3, a buffer rare gas 9 such as neon and argon, external electrodes 11 and 13 that are conductive resin layers formed on the outer surface of the glass bulb 3 at both ends thereof, and metal conductors 15 and 17 that are in a shape of character C, have spring elasticity, and are connected to resin layers of the external electrodes 11 and 13 (see FIG. 2A) (see Japanese Laid-Open Patent Application No. 2003-17005).

Having studied the conventional dielectric barrier discharge lamp, however, the inventors of the present invention found a problem that the corona discharge may happen during the lamp lighting in which a high voltage as high as 1.0 kV to 3.0 kV is applied to the external electrodes 11 and 13, depending on the positions of the metal conductors 15 and 17 relative to the conductive resin layers of the external electrodes 11 and 13.

FIG. 2A shows the conventional dielectric barrier discharge lamp 1 viewed in the tube axis direction. FIG. 2B is an enlarged side view of the conventional dielectric barrier discharge lamp 1 for explanation of the positions where corona discharges occur.

When, as shown in FIG. 2B, a rim A of the metal conductor 15 in the shape of a character C precedes a rim B of the external electrode 11 toward the center of the glass bulb 3, and when a gap with a distance "h" is generated between the metal conductor 15 and the glass bulb 3, the corona discharge occurs in the gap (this also applies to the side of the metal conductor 17).

When the corona discharge occurs ozone is generated. The generated ozone causes the conductive resin layers, which constitute the external electrode 11, and a resin (not illustrated) that is used in circumference of the lamp to deteriorate rapidly. Even a small amount of ozone may have a disadvantageous effect. That is to say, ozone may decrease the life of the fluorescent lamp, backlight unit, or liquid crystal television by causing the members made of resin to deteriorate.

SUMMARY OF THE INVENTION

The object of the present invention is therefore to provide a fluorescent lamp, backlight unit, and liquid crystal television that restrict the occurrence of the corona discharge during the lamp lighting.

The above object is fulfilled by a fluorescent lamp, comprising: a glass bulb that is in a shape of a tube and has a discharge space therein; external electrodes that are conductive layers each of which covers an outer surface of the glass bulb at an end; and metal members that are respectively connected to the external electrodes by covering at least part of the external electrodes, wherein the metal members are formed such that ends of each metal conductor recede from ends of each corresponding external electrode toward a center of each corresponding external electrode.

In the above-stated fluorescent lamp, the metal members may be formed such that rims of the metal members recede from a center of the glass bulb more than rims of the external electrodes in a tube axis direction.

In the above-stated fluorescent lamp, the conductive layers may be made from a conductive paste.

The above-stated fluorescent lamp may further comprise shutoff layers that cover (i) the external electrodes or (ii) the external electrodes and the metal members, such that the external electrodes are shut out from an outside air.

In the above-stated fluorescent lamp, a light extraction portion of the glass bulb positioned in a middle thereof may be in a flat shape in a transverse section.

In the above-stated fluorescent lamp, the metal members may be in a shape of either a sleeve or a cap, and the rims of the metal members may recede from the center of the glass bulb 1 mm or more than the rims of the external electrodes in the tube axis direction.

In the above-stated fluorescent lamp, the metal members may be respectively connected to the external electrodes by covering the external electrodes by 3 mm or more in length.

In the above-stated fluorescent lamp, the rims of the metal members may be chamfered.

In the above-stated fluorescent lamp, the metal members may be formed into a shape of a sleeve by winding a thin material around the external electrodes, putting ends of the wound-around thin material together, and crushing the put-together ends.

In the above-stated fluorescent lamp, the metal members may be in a shape of either a sleeve or a cap, and the metal members may be inserted into the glass bulb from the ends thereof by a heat-fitting method, and the metal members may be connected to the external electrodes.

In the above-stated fluorescent lamp, the metal members may be in a shape of a cap, and the metal members may have slits that extend in a longitudinal direction such that the metal members are connected firmly to the external electrodes by an elastic force of the metal members when the metal members are attached to the external electrodes.

In the above-stated fluorescent lamp, the conductive layers may be made of a material selected from a group that consists of a silver paste, a nickel paste, a gold paste, a palladium paste, and a carbon paste.

In the above-stated fluorescent lamp, the conductive layers may contain 1% by weight or more of a low-melting-point glass.

In the above-stated fluorescent lamp, the conductive layers may be formed by a dipping method.

In the above-stated fluorescent lamp, the ends of the glass bulb excluding the light extraction portion may be substantially in a circular shape in a transverse section, and the external electrodes may be disposed on an outer surface of the glass bulb at the ends that are substantially in the circular shape in the transverse section, such that there is a distance between one of the rims of the external electrodes and one end of the light extraction portion that face each other in a tube axis direction of the glass bulb, for each pair of one rim of the external electrodes and one end of the light extraction portion that face each other.

In the above-stated fluorescent lamp, the shutoff layers may be formed by a metal film.

In the above-stated fluorescent lamp, the shutoff layers may be formed as metal films or insulating films such that part of the metal members is exposed to the outside air.

The above object is also fulfilled by a direct-below-type backlight unit for use in a liquid crystal television, comprising: a plurality of fluorescent lamps among which one or more are the fluorescent lamp recited above; and one high-frequency electronic ballast that lights all of the plurality of fluorescent lamps.

The above object is also fulfilled by a liquid crystal television which comprises the backlight unit recited above.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Embodiment 1

1. Overall Construction

Figure 3:
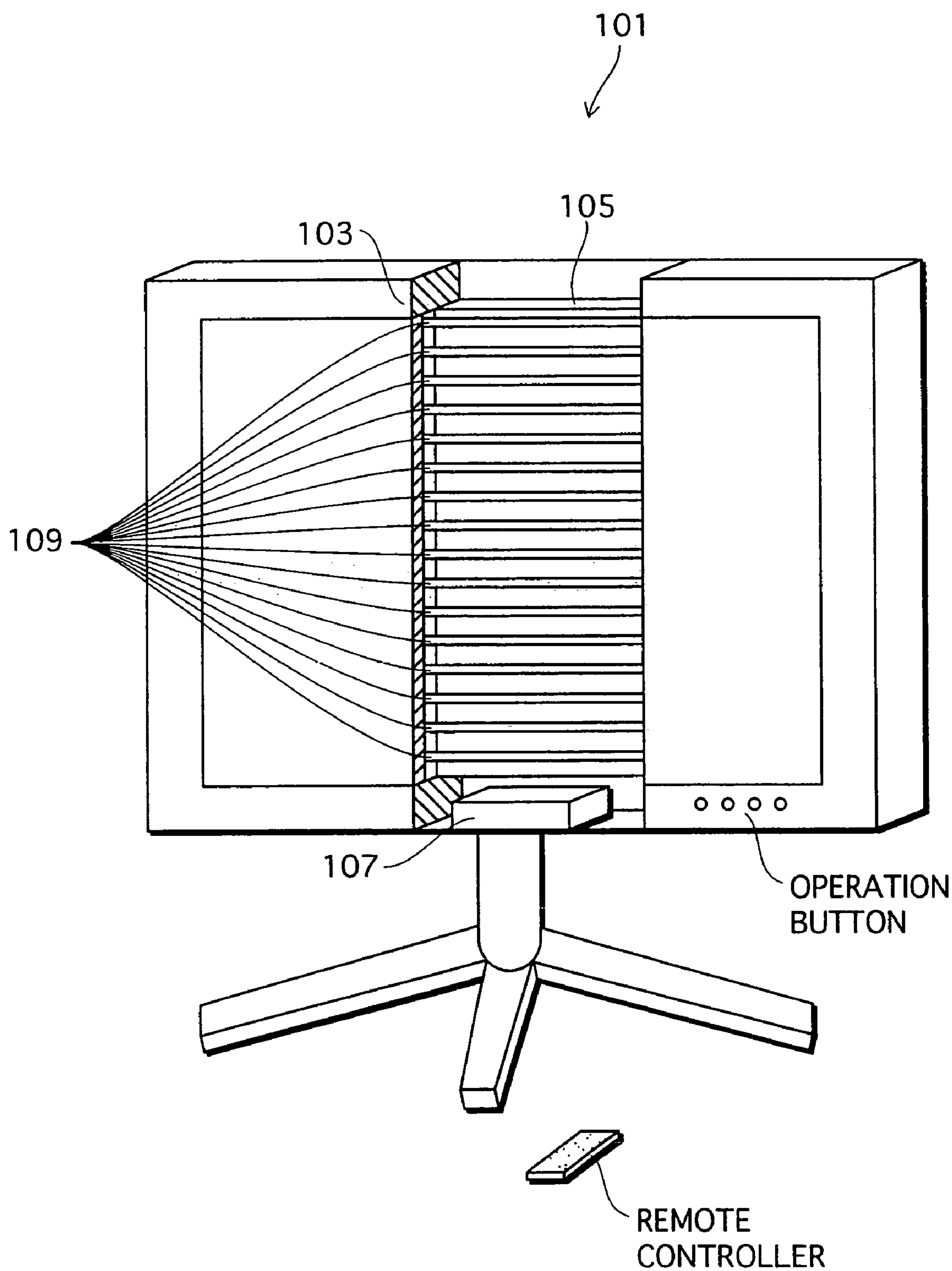
FIG. 3 shows an outline of a liquid crystal television in Embodiment 1 of the present invention.

FIG. 3 shows an outline of a liquid crystal television 101 in Embodiment 1 of the present invention.

The liquid crystal television 101 shown in FIG. 3 is, for example, a 32-inch liquid crystal television, and includes a liquid crystal screen unit 103 and a backlight unit 105.

The liquid crystal screen unit 103 further includes, for example, a color filter substrate, liquid crystal, a TFT substrate, a driving module or the like (not illustrated), and forms color images based on image signals received from outside.

The backlight unit 105 is a LCBL unit, and includes a high-frequency electronic ballast 107 and 16 number of dielectric barrier discharge lamps 109 (hereinafter merely referred to as lamps). Each of the lamps 109 is attached to a socket board 111 shown in FIG. 4.

The socket board 111 has pairs of electrode sockets 113 and 115, each pair being to hold both ends of a lamp 109 so that 16 number of lamps 109 are lighted while held by the socket board 111. The electrode sockets 113 and 115 are made of elastic stainless, phosphor bronze or the like. A width F of the electrode sockets 113 and 115 is designed to be appropriate for restricting occurrence of the corona discharge during lighting of the lamp, more specifically to be smaller than the width of the external electrodes 123 and 125, which will be described later.

The high-frequency electronic ballast 107 is a lighting circuit for lighting all the 16 number of lamps 109.

2. Construction of Lamp

Figure 5A:
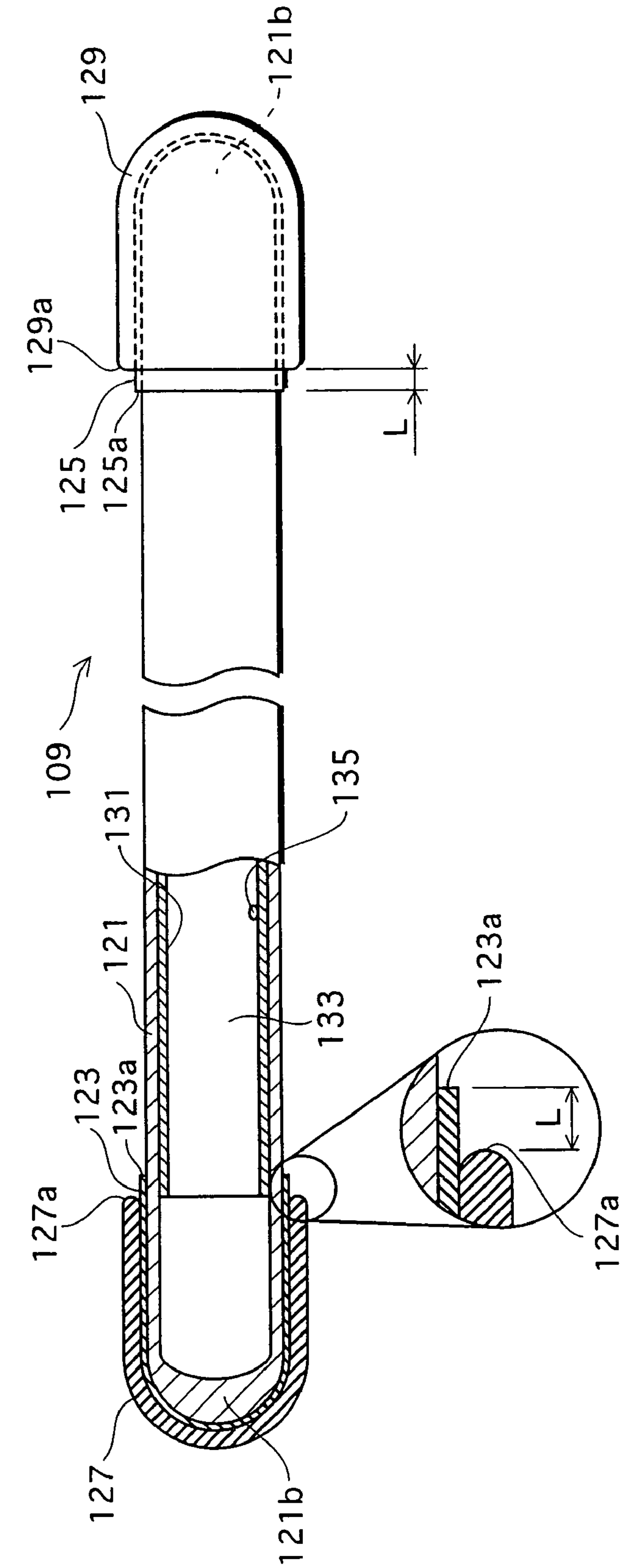
FIG. 5A shows an outline of a lamp 109 in Embodiment 1.

FIG. 5A shows an outline of the lamp 109 in Embodiment 1 of the present invention.

As shown in FIG. 5A, the lamp 109 in Embodiment 1 of the present invention is provided with external electrodes 123 and 125 that are conductive layers formed at both ends of a glass bulb 121 that is in a shape of a tube. The conductive layers are made from, for example, conductive paste. The lamp 109 is further provided with metal conductors 127 and 129 that are respectively connected to the external electrodes 123 and 125 by covering at least part of the external electrodes 123 and 125.

The metal conductors 127 and 129 are made of a material that has excellent electric conductivity, and has a thermal expansion coefficient that is close to that of the glass bulb 121. Each of the metal conductors 127 and 129 is in a shape of, for example, a cap. The metal conductors 127 and 129 are made of, for example, elastic stainless, phosphor bronze or the like that has excellent electric conductivity. In the present embodiment, the metal conductors 127 and 129 are made of Fe—Ni—Co (kovar).

The metal conductors 127 and 129 are formed such that rims 127*a* and 129*a* of the metal conductors 127 and 129 recede from the center of the glass bulb 121 than rims 123*a* and 125*a* of the external electrodes 123 and 125 by a distance L (for example, 1 mm), respectively toward corresponding ends 121*b* of the glass bulb 121.

The glass bulb 121 is substantially circular in a cross section taken along a plane perpendicular to the tube axis (that is to say, in a transverse section). A mixture of rare-earth phosphors for colors of red [$Y_2O_3$: $Eu^{3+}$], green [$LaPO_4$: $Ce^{3+}$, $Tb^{3+}$], and blue [$BaMg_2Al_{16}O_{27}$: $Eu^{2+}$] is applied to the inner surface of the glass bulb 121, forming a phosphor layer 131 having a thickness of approximately 20 μm. The inside of the glass bulb 121 is filled with a rare gas 133 such as argon or neon at a pressure of approximately 8 kPa and mercury 135 of approximately 2 mg.

The glass bulb 121 is a discharge vessel made of borosilicate glass, in a shape of a straight tube, with the outer diameter being 4.0 mm, the inner diameter 3.0 mm, and the overall length 720 mm.

Figure 5B:
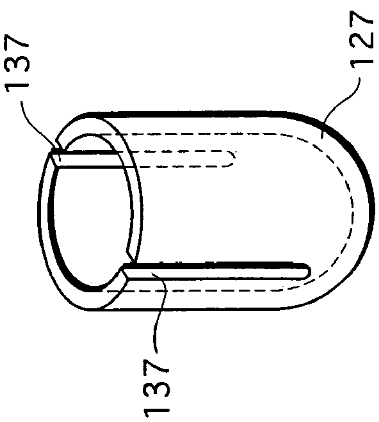
FIG. 5B shows an appearance of the metal conductor 127.

FIG. 5B shows an appearance of the metal conductor 127.

The metal conductor 129 has the same construction as the metal conductor 127. The metal conductor 127 is in a shape of a dome and covers a semispherical end of a cylinder. The metal conductor 127 has two slits 137 that extend in the longitudinal direction such that the metal conductor 127 has elastic force in the circumferential direction. The metal conductor 127 is connected to an external electrode by the elastic force of the metal conductor generated by the slits 137.

The metal conductors 127 and 129 are respectively attached to the ends 121*b* of the glass bulb 121. As shown in FIG. 5A, rims 127*a* and 129*a* of the metal conductors 127 and 129 are chamfered such that the ends do not have sharp edges. This makes it easy to attach the metal conductors 127 and 129 to the ends 121*b* of the glass bulb 121. In addition, this makes the external electrodes 123 and 125 difficult to impair.

It is preferable that the metal conductors 127 and 129 have a definite shape and are not deformed by a force from outside, not like a metal foil or a metal tape that are apt to be deformed by a force from outside and do not recover even after the force is removed.

In the present embodiment, the metal conductors 127 and 129 may have, for example, the overall length of 23.0 mm, the outer diameter on the cylindrical portion being 4.5 mm, the inner diameter 4.1 mm, and the thickness 0.2 mm. As apparent from this, since the metal conductors 127 and 129 need not be deformable like a metal foil or metal tape, they may be formed to be relatively thick such that they are not defected easily.

Here, since the outer diameter of the glass bulb 121 is 4.0 mm and the inner diameter of the metal conductors 127 and 129 is 4.1 mm, a distance of a gap between the glass bulb 121 and the metal conductor 127 and the metal conductor 129 is 0.05 mm in average.

The external electrodes 123 and 125 are formed by applying conductive paste to both ends of the sealed glass bulb 121 by a dipping method in advance to have a predetermined length of, for example, 25.0 mm (that is to say, so that the external electrodes 123 and 125 are 25.0 mm in the overall length), as the following will describe.

It should be noted here that the conductive paste for the external electrodes 123 and 125 is not limited to silver paste, but may be nickel paste, gold paste, palladium paste, or carbon paste. Also, since a low-melting-point glass has a strong bonding force with the surface of the glass bulb 121, it is preferable that the conductive paste contains a low-melting-point glass as a binder. It is preferable that the conductive layers each contain 1% by weight to 10% by weight of a low-melting-point glass. It is also preferable that the low-melting-point glass has approximately $10^{-1}$ Ωcm to $10^{-6}$ Ωcm of specific resistance.

3. Lamp Manufacturing Method

The following describes the procedure of bonding the sealed glass bulb 121 with the external electrodes 123 and 125 and the metal conductors 127 and 129, with reference to FIGS. 6A-6D and FIG. 7.

(1) First Application Process

Figure 6A:
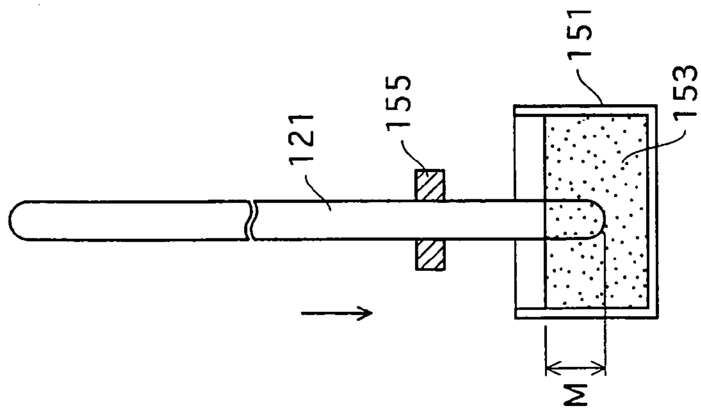
FIGS. 6A-6D shows a procedure of bonding a sealed glass bulb with external electrodes.

As shown in FIG. 6A, the silver paste is diluted by dilute solution of hexane or the like. The diluted silver paste liquid 153 is contained in a container 151, the sealed glass bulb 121 is held by a first retainer 155 at a position between an end and the center of the glass bulb 121, the glass bulb 121 is then lowered such that the end is immersed into the silver paste liquid 153 in the container 151 by a predetermined length of M mm, allowing the silver paste liquid 153 to be applied to the end of the glass bulb 121 (step S1—what is called the "dipping method").

Here, when the external electrode (123) of silver paste is formed on the glass bulb 121 by the dipping method, compared with the case where the external electrode is formed by a conventional spray method or brush application method, the silver paste liquid 153 directly contacts with the outer surface of the glass bulb 121 at a constant pressure. This enables the unevenness of the applied paste to be reduced stably in the tube axis direction or the radius direction of the glass bulb 121.

(2) First Drying Process

Figure 6B:
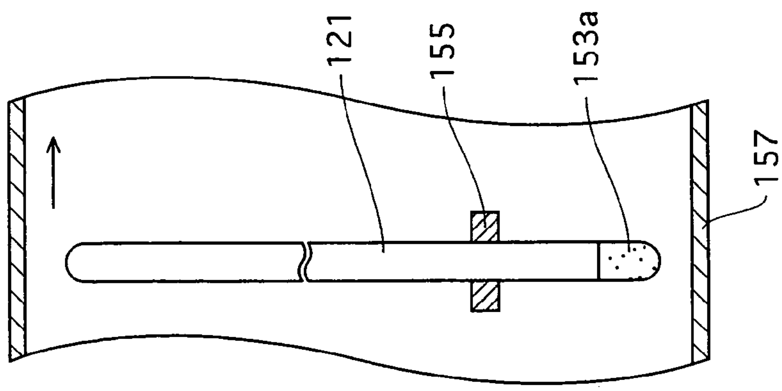

The glass bulb 121 is then pulled up from the silver paste liquid 153 in the container 151. Then a silver paste 153*a* is temporarily bonded with the end of the glass bulb 121 by, as shown in FIG. 6B, passing the glass bulb 121 through a tunnel-like heating furnace 157 (which is under the condition that the processing temperature is approximately 100° C. and the processing time is approximately 1.5 minutes) while the glass bulb 121 is held by the first retainer 155 (step S2).

(3) Second Application Process

Figure 6C:
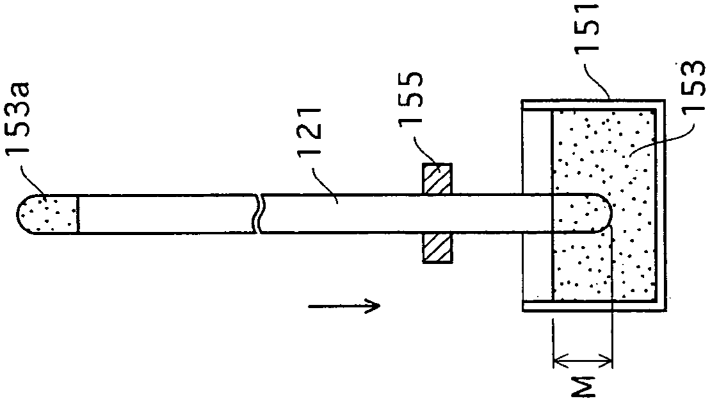

The glass bulb 121 is once cooled to a normal temperature, and is removed from the first retainer 155. After this, as shown in FIG. 6C, the sealed glass bulb 121 is held by the first retainer 155 at a position between the other end and the center of the glass bulb 121, the glass bulb 121 is then lowered such that the other end thereof is immersed into the silver paste liquid 153 in the container 151 by a predetermined length of M mm, allowing the silver paste liquid 153 to be applied to the other end of the glass bulb 121 (step S3).

Here, when the external electrode (125) of silver paste is formed on the glass bulb 121 by the dipping method, compared with the case where the external electrode is formed by a conventional spray method or brush application method, the silver paste liquid 153 directly contacts with the outer surface of the glass bulb 121 at a constant pressure. This enables the unevenness of the applied paste to be reduced stably in the tube axis direction or the radius direction of the glass bulb 121.

(4) Second Drying Process

Figure 6D:
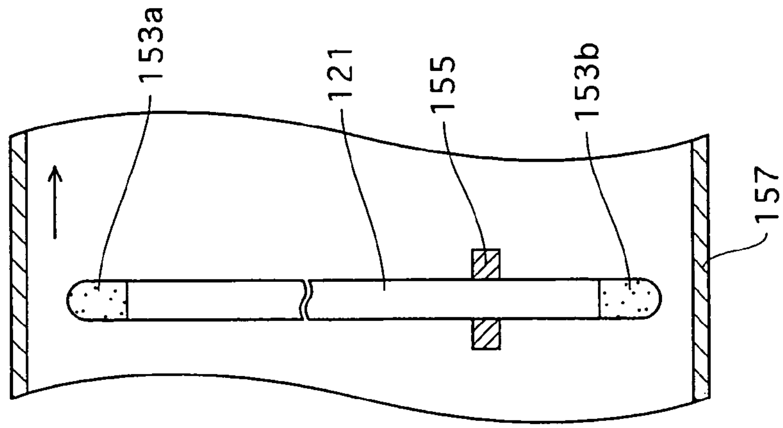

As shown in FIG. 6D, the silver paste 153*a* is bonded with both ends of the glass bulb 121 permanently by, as shown in FIG. 6B, passing the glass bulb 121 through a tunnel-like heating furnace 157 (which is under the condition that the processing temperature is approximately 620° C., and the processing time is approximately 1 minute) while the glass bulb 121 is held by the first retainer 155 (step S4). This enables the external electrodes 123 and 125 to be formed at both ends of the glass bulb 121 as shown in FIG. 5A.

(5) First Insertion Process

Figure 7:
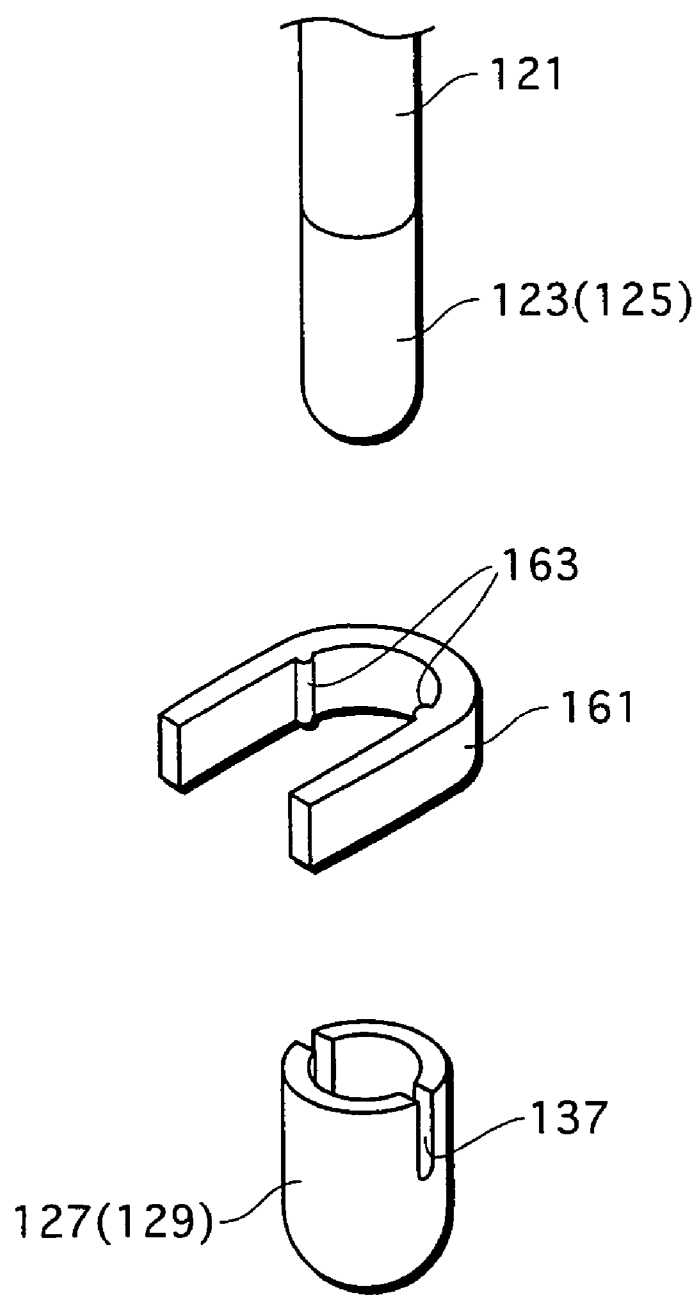
FIG. 7 shows a procedure of bonding the sealed glass bulb with metal conductors.

As shown in FIG. 7, a second retainer 161, which has raised portions 163 whose width is larger than the width of the slits 137 of the metal conductor 127 (129), is used to hold the metal conductor 127 by widening the slits 137 by the raised portions 163.

While maintaining the above-described status, the glass bulb 121 is lowered so that one end of the glass bulb 121 is inserted in the opening of the metal conductor 127 held by the second retainer 161, and the second retainer 161 is removed from the metal conductor 127 and the metal conductor 127 is fixed to the one end of the glass bulb 121 (step S5). In this process, loads, which are given by the elastic force of the metal conductor 127 that is in the shape of a cap, are applied evenly to the outer surface of the silver paste (the external electrode 123). This prevents a crack from being generated due to a load concentrated on a portion of the silver paste that constitutes the external electrode 123.

(6) Second Insertion Process

Similarly, the raised portions 163 of the second retainer 161 are used to hold the metal conductor 129 by widening the slits 137 of the metal conductor 129 by the raised portions 163. While maintaining this status, the glass bulb 121 is lowered so that the other end of the glass bulb 121 is inserted in the opening of the metal conductor 129 held by the second retainer 161, and the metal conductor 129 is fixed to the other end of the glass bulb 121.

This completes the manufacturing of the lamp 109 in the shape of a straight tube (step S6). In this manufacturing process, a load is given by the elastic force of the metal conductor 127 that is in the shape of a cap and is applied evenly to the outer surface of the silver paste that constitutes the external electrode 125, thus preventing a crack from being generated.

4. Acts and Effects

The following describes the acts and effects of the lamp 109.

(1) Positional Relationship Between External Electrodes and Metal Conductors

Figure 2B:
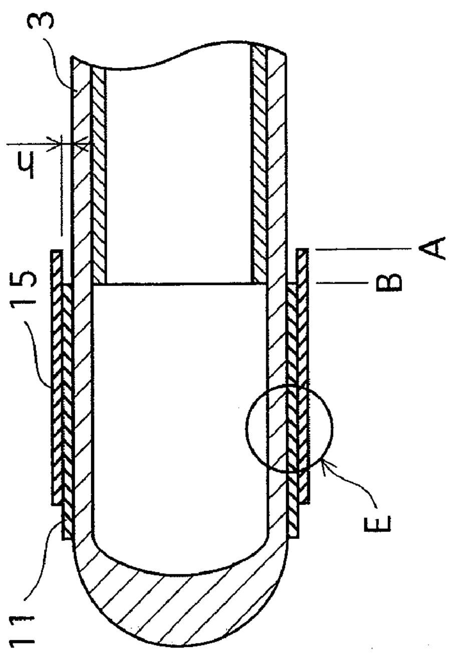
FIG. 2B shows the positions where corona discharges occur.

The inventors of the present invention, through various studies, reached a conclusion that, as has been explained in "Description of the Related Art", the corona discharge occurs in the gap that is generated between the metal conductor 15 (17) and the glass bulb 3 when the end A of the metal conductor 15 precedes the end B of the external electrode 11 toward the center of the glass bulb 3 (see FIG. 2B).

For this reason, Embodiment 1 of the present invention is provided with the metal conductors 127 and 129 that are in a shape of a cap and are connected to and cover at least part of the outer surface of the external electrodes 123 and 125, respectively, the external electrodes 123 and 125 being conductive layers formed on the outer surface of the glass bulb 121. The rims 127*a* and 129*a* of the metal conductors 127 and 129 are disposed such that the rims 127*a* and 129*a* of the metal conductors 127 and 129 recede from the center of the glass bulb 121 than the rims 123*a* and 125*a* of the external electrodes 123 and 125 by the distance L, respectively toward ends 121*b* of the glass bulb 121.

In other words, the fluorescent lamp includes: a glass bulb that is in a shape of a tube and has a discharge space inside thereof; external electrodes that are conductive layers each formed on the outer surface of the glass bulb at an end thereof; and metal conductors that are respectively connected to and cover at least part of the external electrodes, where rims of the metal conductors covering the external electrodes are closer to ends of the glass bulb than rims of the external electrodes.

Here, results of an experiment will be described.

Figure 8:
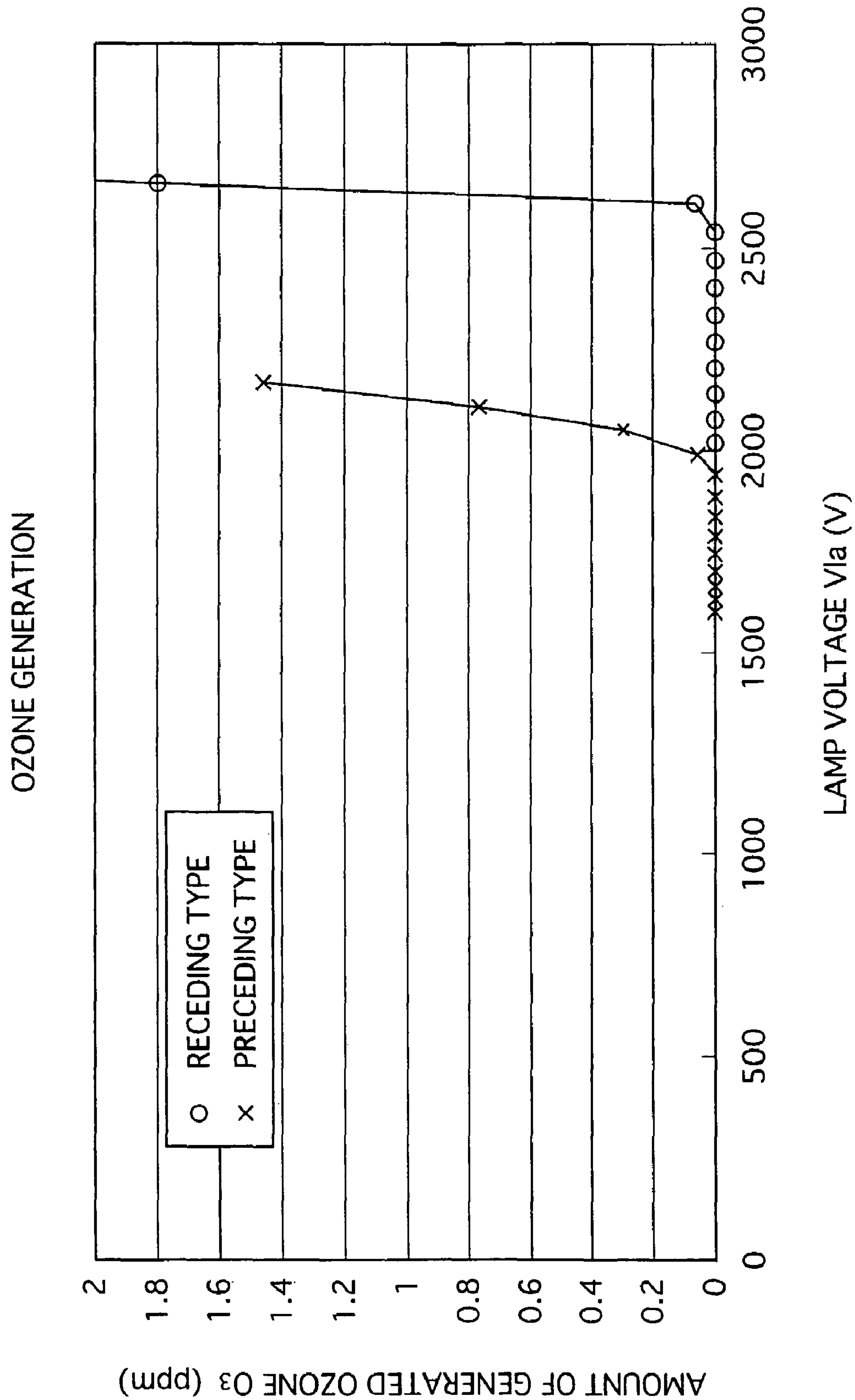
FIG. 8 shows how positions of the metal conductors relative to the external electrodes affect the occurrence of ozone.

FIG. 8 shows how positions of the metal conductors relative to the external electrodes affect the occurrence of ozone.

Two types of lamps were prepared for the experiment. The two types of lamps are the same in the construction of the glass bulb and the external electrodes, but are different in the length of the metal conductors. In one of the two types, the metal conductors precede the external electrodes toward the center of the glass bulb more (the type is referred to as "preceding type"). Three samples for this type were prepared which precede the external electrodes toward the center of the glass bulb by 0.5 mm, 1 mm, and 2 mm, respectively. In the other type, the metal conductors recede from the center of the glass bulb more than the external electrodes (the type is referred to as "receding type."). Four samples for this type was prepared which respectively recede from the center of the glass bulb 0.1 mm, 0.5 mm, 1 mm, and 2 mm than the external electrodes.

An experiment was conducted to study how ozone is generated as the lamp voltage Vla is increased. The sign "X" indicates the measurement results of the preceding type lamps, and the sign "○" indicates the measurement results of the receding type lamps.

As shown in FIG. 8, the preceding type lamps (indicated by sign "X") start generating ozone when the lamp voltage Vla reaches approximately 1900 V. On the other hand, the receding type lamps (indicated by sign "○") start generating ozone when the lamp voltage Vla reaches approximately 2600 V.

It should be noted here that the three samples of the preceding type that precede the external electrodes by 0.5 mm, 1 mm, and 2 mm had approximately the same result. Similarly, the four samples of the receding type that recede 0.1 mm, 0.5 mm, 1 mm, and 2 mm than the external electrodes had approximately the same result. It is considered that this indicates that the generation of ozone can be restricted if the metal conductors do not precede the external electrodes toward the center of the glass bulb.

It is apparent from this that the receding type restricts the generation of ozone more than the preceding type. In the actual lighting, approximately 2000 V of lamp voltage V is applied. Under this condition, the receding type lamp (lamp of the present invention) hardly generate ozone.

As described above, the lamp of the present invention does not have the gap with the distance "h" (see FIG. 2B) mentioned in "Description of the Related Art" between the glass bulb 121 and each of the metal conductors 127 and 129. This construction prevents the corona discharge from occurring between the glass bulb 121 and each of the metal conductors 127 and 129 during the lamp lighting, provides an advantageous effect (referred to as "the first effect") that it can provide a fluorescent lamp with external electrodes that can live approximately as long as the other parts thereof, and a backlight unit and liquid crystal television that are provided with the fluorescent lamp.

Also, the rims 127*a* and 129*a* of the metal conductors 127 and 129 are attached such that they recede from the center of the glass bulb 121 1 mm or more than the rims 123*a* and 125*a* of the external electrodes 123 and 125, namely ensuring 1 mm or more of the distance L between them. With this construction, even if there are variations in the positions at which the metal conductors 127 and 129 are attached, the gap with distance "h" between the glass bulb 121 and each of the metal conductors 127 and 129 (see FIG. 2B) is not apt to be generated easily. As explained above, this construction provides an advantageous effect (referred to as "the second effect") of preventing the corona discharge from occurring between the glass bulb 121 and each of the metal conductors 127 and 129 during lighting of the lamp.

The metal conductors 127 and 129 cover the external electrodes 123 and 125 by 3 mm or more in length. This construction enables the metal conductors 127 and 129, which are at both ends of the dielectric barrier discharge lamp 109, to be stably connected to and held by the electrode sockets 113 and 115 of the socket board 111 so that the lamp is lighted stably (these advantageous effects are referred to as "the third effect").

The rims 127*a* and 129*a* of the metal conductors 127 and 129 attached to the glass bulb 121 are chamfered. This construction enables the metal conductors 127 and 129 to be attached to the ends 121*b* of the glass bulb 121 with ease, and prevents the metal conductors 127 and 129, during the attachment thereof, from making defects onto the outer surface of the external electrodes 123 and 125 (these advantageous effects are referred to as "the fourth effect").

The metal conductors 127 and 129 each have two or more slits 137 that extend in the longitudinal direction such that the 127 and 129 are connected to the external electrodes 123 and 125 by the elastic force generated by the slits 137. This construction enables the metal conductors 127 and 129 to be attached to the ends 121*b* of the glass bulb 121 with ease, and prevents the metal conductors 127 and 129, during the attachment thereof, from making defects onto the outer surface of the external electrodes 123 and 125 (these advantageous effects are referred to as "the fifth effect").

The conductive layers that constitute the external electrodes 123 and 125 are made from silver paste. This improves the adhesiveness of the external electrodes 123 and 125 with the glass bulb 121, and makes the external electrodes 123 and 125 difficult to remove from the surface of the glass bulb 121. This prevents the corona discharge from occurring in a gap between the external electrode 123 and the glass bulb 121 and a gap between the external electrode 125 and the glass bulb 121. Also, when it is presumed that the glass bulb 121, the discharge space, and the external electrode 123 forms a first capacitor, and that the glass bulb 121, the discharge space, and the external electrode 125 forms a second capacitor, the above-stated improvement in the adhesiveness of the external electrodes 123 and 125 with the glass bulb 121 makes the electrostatic capacity of the first capacitor substantially equal to that of the second capacitor (the actual contact area between the external electrodes and the glass bulb substantially becomes as designed) (these advantageous effects are referred to as "the sixth effect").

Furthermore, the conductive paste from which the external electrodes 123 and 125 are made contains 1% by weight to 10% by weight of a low-melting-point glass. This construction prevents the metal conductors 127 and 129, during the attachment thereof onto the external electrodes 123 and 125 at the ends 121*b* of the glass bulb 121, from making defects onto the outer surface of the external electrodes 123 and 125 (these advantageous effects are referred to as "the seventh effect")

(2) Forming Conductive Layers Constituting External Electrodes

Upon further investigations, the inventors of the present invention found that the corona discharge also occurs in a space between the central portion (inner surface) of the metal conductors and the glass bulb.

Figure 1:
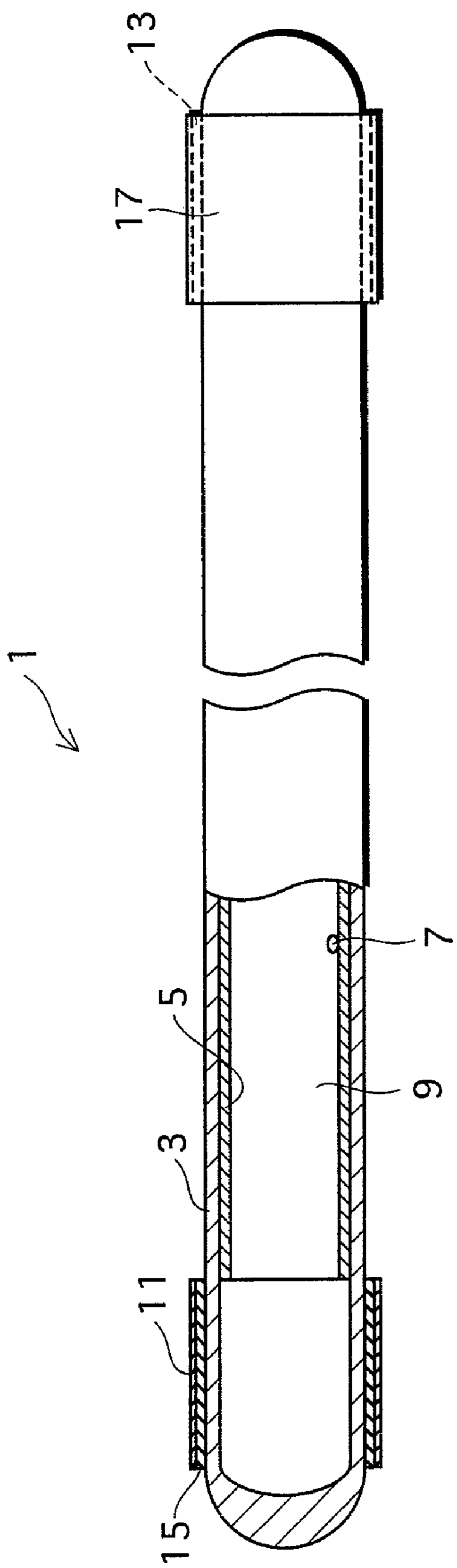
FIG. 1 shows an outline of a typical conventional dielectric barrier discharge lamp 1.
Figure 2C:
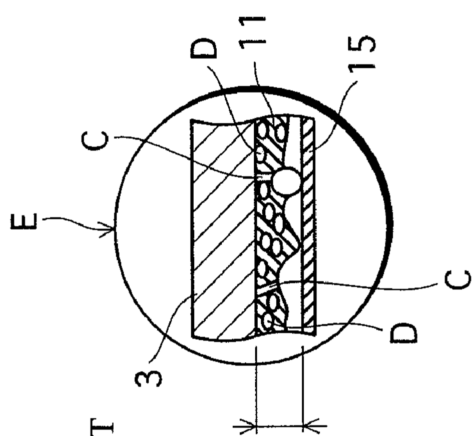
FIG. 2C is an enlarged view of a portion E shown in FIG. 2B.
Figure 2A:
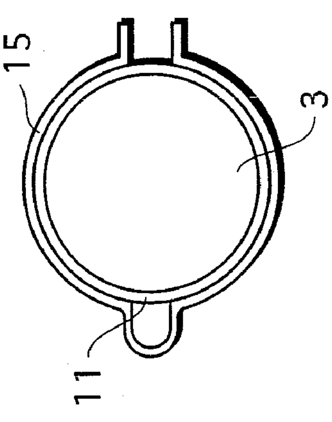
FIG. 2A shows the conventional dielectric barrier discharge lamp 1 viewed in the tube axis direction.

That is to say, when the external electrodes 11 and 13 are conductive resin layers formed in a cylindrical shape on the outer surface of the glass bulb 3 at both ends thereof, as shown in FIGS. 1 and 2, the external electrodes 11 and 13 may be removed during lighting from the surface of the glass bulb 3 due to the difference between the materials in thermal expansion. Also, due to the pressure applied by the elastic force of the metal conductors 15 and 17, the surface of the external electrodes 11 and 13 in the cylindrical shape is pressed by the metal conductors 15 and 17 when the external electrodes 11 and 13 expand by heat, and cracks C may be generated in the conductive resin layers of the external electrodes 11 and 13, as shown in FIG. 2C. FIG. 2C is an enlarged view of a portion E shown in FIG. 2B.

In general, the external electrodes 11 and 13 are formed into the cylindrical shape near the ends of the glass bulb 3 as follows. The surface of the glass bulb 3, except for the portions on which the external electrodes 11 and 13 are to be formed, is masked by tape or the like, and the paste is applied to the target portion of the masked glass bulb by rotating the glass bulb, by the spray method for brush application method.

However, the conductive resin layers of the external electrodes 11 and 13 formed as described above by such methods have depressions and projections in the tube axis direction of the glass bulb 3 since the paste is applied unevenly. The conductive resin layers of the external electrodes 11 and 13 are then dried. The metal conductors 15 and 17 in the shape of character C having spring elasticity are then attached to the outer surface of the external electrodes 11 and 13. In this attachment, loads are applied in a concentrated manner to the largest projection among the projections of the conductive resin layers that are generated due to the unevenness of the applied paste (the spray method generates projections in blocks, and the brush application method generates projections in streaks) This may generate cracks C in the conductive resin layers as shown in FIG. 2C.

It was found that if such cracks C are generated in the conductive resin layers, the corona discharge occurs there, that is to say, in a space between the inner surface of the metal conductors 15 and 17 and the outer surface of the glass bulb 3, and ozone is generated.

In Embodiment 1 in which this problem has been taken into consideration, the external electrodes 123 and 125 are formed by applying conductive paste (silver paste) to both ends 121*a* of the sealed glass bulb 121, and then the metal conductors 127 and 129 in a shape of a cap are provided such that they are respectively connected to the external electrodes 123 and 125 by covering at least part of the circumferential surface of the external electrodes 123 and 125.

Especially, when a low-melting-point glass is contained in the conductive paste as a binder, the glass bulb 121 and the external electrodes 123 and 125 are close to each other in the thermal expansion coefficient. This prevents the external electrodes 123 and 125 from being removed or having cracks during lighting due to the difference in thermal expansion. This prevents the gap with distance "h" (see FIG. 2B) from being generated between the glass bulb 121 and each of the metal conductors 127 and 129 and between the glass bulb 121 and each of the external electrodes 123 and 125. This makes it possible to provide a fluorescent lamp, backlight unit, and liquid crystal television that restrict the occurrence of the corona discharge during the lamp lighting, and have external electrodes that can live approximately as long as the other parts thereof (these advantageous effects are referred to as "the eighth effect").

The external electrodes 123 and 125 are formed on the outer surface of the glass bulb 121 at the ends 121*b* thereof, by the dipping method using the conductive paste. Compared with the case where the external electrodes are formed by the conventional spray method or brush application method, this construction can reduce the unevenness of the applied paste in the tube axis direction and the radius direction of the glass bulb 121. As a result, loads are applied evenly to the outer surface of the external electrodes 123 and 125 made from the conductive paste when the metal conductors 127 and 129 in the shape of a cap are attached to the outer surface of the external electrodes 123 and 125. This prevents cracks from being generated in the conductive paste, and further restricts the occurrence of the corona discharge during the lamp lighting (these advantageous effects are referred to as "the ninth effect").

It is apparent from the above description that a lamp can prevent cracks from being generated in the external electrodes 11 and 13 if the lamp includes: a glass bulb that is sealed at both ends thereof and has a discharge space inside; external electrodes that are formed by covering both ends of the glass bulb with conductive paste; and metal members that are respectively connected to the external electrodes by covering at least part of the external electrodes and are in a shape of a cap or a sleeve. It should be noted here that the conductive paste may be a resin type, not limited to the several types of paste explained in Embodiment 1. However, the strong adhesiveness of the conductive paste with the surface of the glass bulb 121 taken into consideration, it is preferable that the conductive paste contains a low-melting-point glass as a binder.

5. Modification to Embodiment 1

(1) Modification 1

Figure 9:
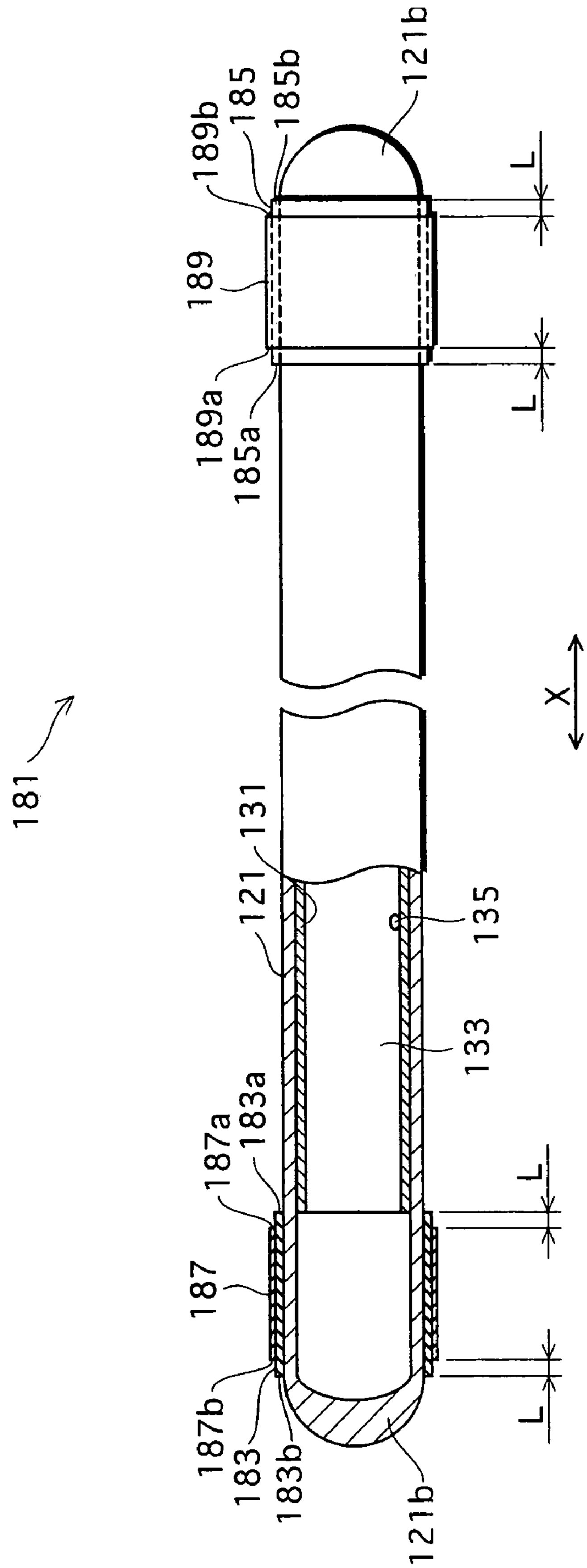
FIG. 9 shows an outline of a lamp 181 in Modification 1 to Embodiment 1.

FIG. 9 shows an outline of a lamp 181 in Modification 1 to Embodiment 1. Modification 1 differs from Embodiment 1 in the following points: (a) metal conductors 187 and 189 are formed into a shape of a sleeve (cylinder), are made of a material that is substantially the same as the glass bulb in the thermal expansion coefficient, are inserted into the glass bulb 121 from the ends 121*b* by a heat-fitting method, and are firmly connected to the external electrodes 183 and 185; and (b) ends 187*a* and 187*b* of the metal conductor 187 (ends 189*a* and 189*b* of the metal conductor 189) recede from ends 183*a* and 183*b* of the external electrodes 183 toward the center of the external electrodes 183 by a distance L, respectively.

In the following description, the same components as those of the lamp 109 in Embodiment 1 are assigned the same numbers and the description thereof is omitted.

Modification 1 uses a conductive paste instead of the conventional conductive resin layer. Accordingly, Modification 1 does not have the gap with the distance "h" (see FIG. 2B) mentioned in "Description of the Related Art" between the glass bulb 121 and each of the metal conductors 187 and 189, and provides the first and sixth effects described above.

Also, with the construction in which ends 187*a* and 187*b* of the metal conductor 187 (ends 189*a* and 189*b* of the metal conductor 189) recede from ends 183*a* and 183*b* of the external electrodes 183 toward the center of the external electrodes 183 by a distance L, respectively, Modification 1 provides the second effect described above.

Furthermore, with the construction in which metal conductors 187 and 189 are firmly connected to the external electrodes 183 and 185 by the heat-fitting method, the metal conductors 187 and 189 in a cylindrical shape are in intimate contact with the external electrodes 183 and 185, and the electric connection is stabilized (these advantageous effects are referred to as "the eleventh effect").

(2) Modification 2

Figure 10B:
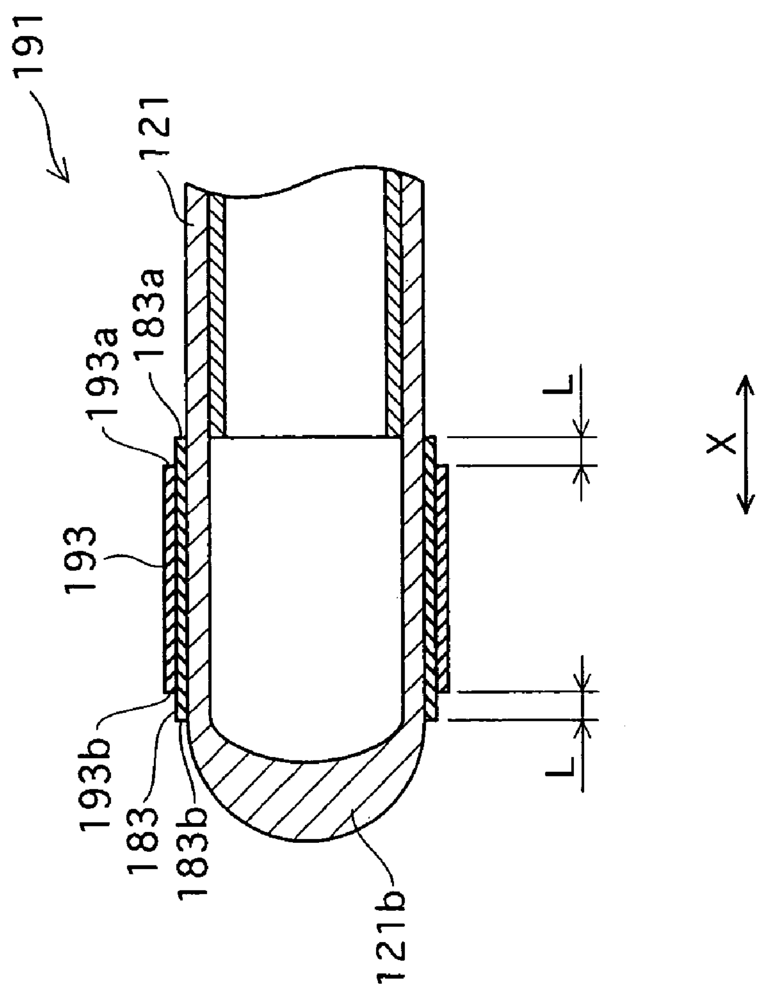
FIG. 10B shows an outline of the lamp 191.
Figure 10A:
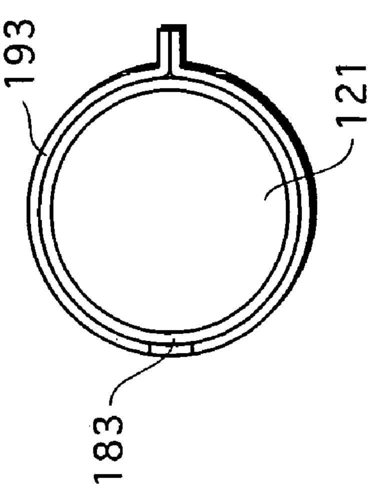
FIG. 10A is a side view of a lamp 191 in Modification 2 to Embodiment 1.

FIG. 10A is a side view of a lamp 191 in Modification 2 to Embodiment 1. FIG. 10B shows an outline of the lamp 191.

Modification 2 differs from Modification 1 in that the metal member is formed into a shape of a sleeve by winding a thin metal conductor 193 around the external electrode 183, putting ends of the wound-around thin metal conductor 193, and crushing the put-together ends. The metal conductor 193 is the same as a metal conductor provided in the opposite end of the lamp 191 (not illustrated).

In the following description, the same components as those of the lamp 109 in Embodiment 1 or those of the lamp 181 in Modification 1 are assigned the same numbers and the description thereof is omitted.

With the stated construction, Modification 2 does not have the gap with the distance "h" (see FIG. 2B) mentioned in "Description of the Related Art" between the glass bulb 121 and the metal conductor 193, and provides the sixth effect described above. Also, since the external electrode 183 is made from a conductive paste, Modification 2 provides the first and sixth effects described above.

Also, with the construction in which ends 193*a* and 193*b* of the metal conductor 193 recede from ends 183*a* and 183*b* of the external electrodes 183 toward the center of the external electrodes 183 by a distance L, respectively, Modification 2 provides the second effect described above.

Furthermore, with the construction in which that the metal conductor 193 is formed by winding a thin metal conductor around the external electrode 183 that is provided on the glass bulb 121, if the outer diameter of the glass bulb 121 is varied, the metal conductor can be easily attached using a low-price thin metal conductor (these advantageous effects are referred to as "the twelfth effect").

(3) Combinations

The external electrodes and the metal conductors provided at both ends of the glass bulb 121 may not necessarily be in the same shape, but may be in any combination of shapes selected from Embodiment 1, Modification 1, and Modification 2.

(4) Shape of Glass Bulb in Transverse Section

In the above-described embodiment, the glass bulb 121 is circular in the transverse section. However, not limited to this, the glass bulb 121 may be, for example, elliptical (see Embodiment 3) in the transverse section.

Embodiment 2

The lamp in Embodiment 2 is characterized in that the fluorescent lamp in Embodiment 1 is provided with shutoff layers that cover the external electrodes such that the external electrodes are shut out from an outside air.

1. Construction of Lamp

Figure 11A:
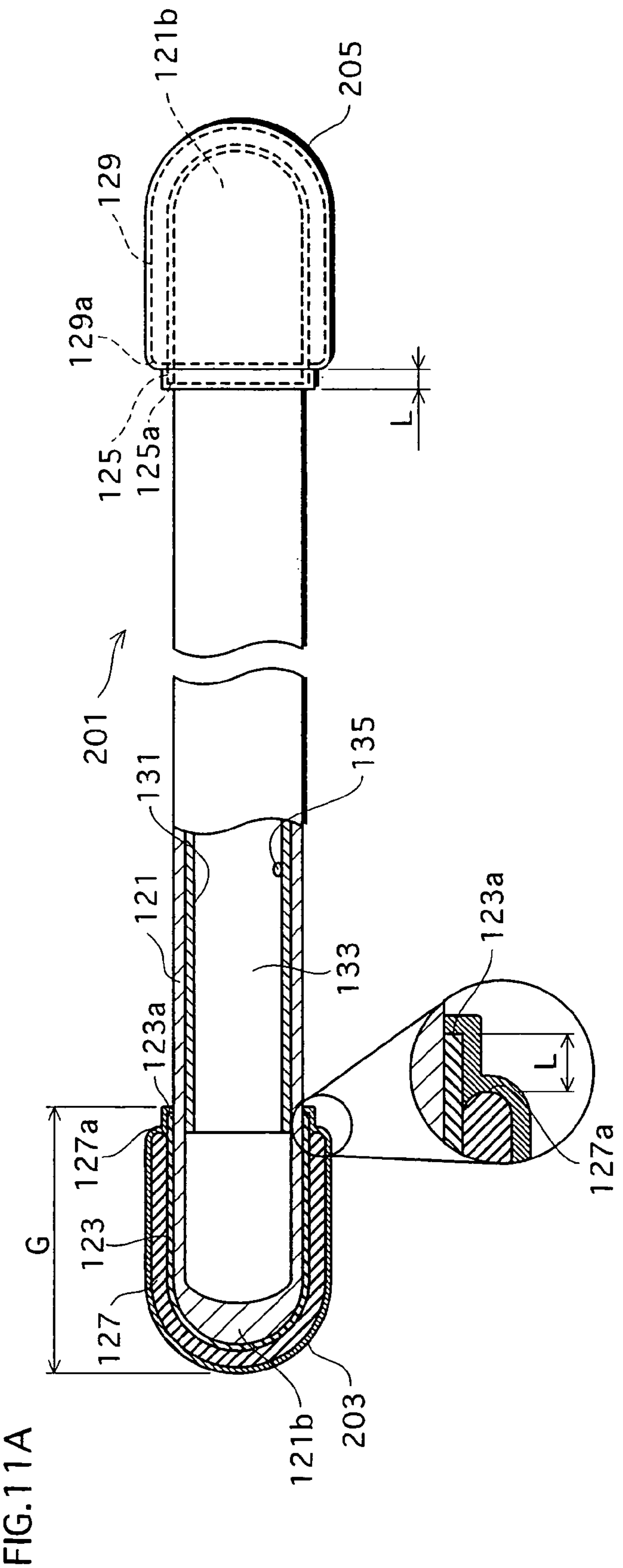
FIG. 11A shows an outline of a lamp 201 in Embodiment 2 of the present invention.

FIG. 11A shows an outline of the lamp 201 in Embodiment 2 of the present invention.

As shown in FIG. 11A, the lamp 201 in Embodiment 2 of the present invention is provided with external electrodes 123 and 125 that are conductive layers formed by the dipping method at both ends of the glass bulb 121 that is in a shape of a tube. The lamp 201 is further provided with metal conductors 127 and 129 that are respectively connected to the external electrodes 123 and 125 by covering at least part of the external electrodes 123 and 125.

The glass bulb 121, external electrodes 123 and 125, and metal conductors 127 and 129 are the same as those recited in Embodiment 1 with the same numbers. The metal conductors 127 and 129 are formed such that rims 127*a* and 129*a* of the metal conductors 127 and 129 recede from the center of the glass bulb 121 than rims 123*a* and 125*a* of the external electrodes 123 and 125 by a distance L (for example, 1 mm), respectively toward corresponding ends 121*b* of the glass bulb 121.

In addition to the above components, the lamp 201 in Embodiment 2 is provided with shutoff layers 203 and 205 that are made of solder layers and cover the external electrodes 123 and 125 such that the external electrodes 123 and 125 are shut out from an outside air. The shutoff layers 203 and 205 are formed to surround the external electrodes 123 and 125 and the metal conductors 127 and 129.

As is the case with Embodiment 1, the phosphor layer 131 is formed on the inner surface of the glass bulb 121, and the inside of the glass bulb 121 is filled with the rare gas 133 and the mercury 135. The glass bulb 121 in Embodiment 2 is the same as the glass bulb 121 in Embodiment 1 in the material, measurement, shape and the like, and the description thereof is omitted.

Figure 11B:
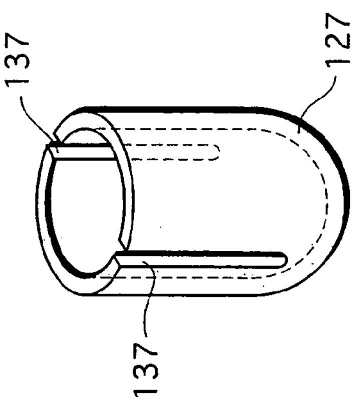
FIG. 11B shows an appearance of a metal conductor 127.

FIG. 11B shows an appearance of the metal conductor 127.

The metal conductor 129 in Embodiment 2 is the same as the metal conductor 127, and is the same as the metal conductor 129 in Embodiment 1 in the measurement, shape or the like. As described in Embodiment 1, it is preferable that the metal conductors 127 and 129 have a definite shape and are not deformed by a force from outside. The metal conductors may be in a shape of a sleeve, such as a metal conductor 207 shown in FIG. 1C. The metal conductor 207 can change elastically in both directions in which the diameter is decreased and increased (the same attachment method or the like described in Modification 1 is used for the metal conductor 207).

The external electrodes 123 and 125 are formed by the dipping method using conductive paste such as silver paste, as in Embodiment 1. It should be noted here that the conductive paste for the external electrodes 123 and 125 is not limited to the silver paste, but may be any conductive paste. Also, the conductive paste may contain a low-melting-point glass as a binder (as in Embodiment 1).

The shutoff layers 203 and 205 are formed by applying solder to both ends of the sealed glass bulb 121 by the dipping method to have at least a predetermined length (for example, 25.0 mm), such that the shutoff layers 203 and 205 surround the external electrodes 123 and 125 and the metal conductors 127 and 129.

2. Lamp Manufacturing Method

The following describes a manufacturing method for the lamp 201 in Embodiment 2.

The lamp 201 is manufactured by first manufacturing the glass bulb 121, then forming the external electrodes 123 and 125, attaching the metal conductors 127 and 129, and lastly forming the shutoff layers 203 and 205 that are the characteristic part of Embodiment 2.

That is to say, the lamp 201 of Embodiment 2 is manufactured by first manufacturing a lamp by the manufacturing method explained in Embodiment 1 (see, for example, FIGS. 6A-6D and FIG. 7), and then forming the shutoff layers 203 and 205 that are the characteristic part of Embodiment 2.

Accordingly, the following will describe the process of forming the shutoff layers 203 and 205.

FIGS. 12A-12D show the procedure for forming the shutoff layers 203 and 205.

(1) First Formation Process

First, the glass bulb 121 is prepared as described in Embodiment 1. As described above, the glass bulb 121 includes external electrodes (123 and 125) and metal conductors (127 and 129).

Figure 12A:
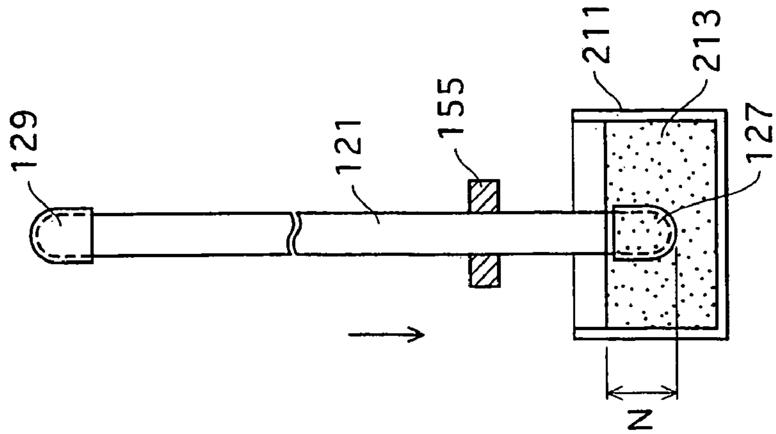
FIGS. 12A-12D show the procedure for forming the shutoff layers 203 and 205.

As shown in FIG. 12A, melted solder 213 is contained in a container 211, the sealed glass bulb 121 is held by the first retainer 155 at a position between an end and the center of the glass bulb 121 (the position exclude both ends of the glass bulb 121 where the external electrodes 123 and 125 and the metal conductors 127 and 129 have been formed). The glass bulb 121 is then lowered such that the end thereof is immersed into the solder 213 in the container 211 by a predetermined length of N mm (the N mm is longer than the M mm in Embodiment 1 (see FIG. 7)) (it is immersed for 1 second to 2 seconds), and then the glass bulb 121 is pulled up so that the solder is attached to the end of the glass bulb 121 (the dipping method).

Figure 12B:
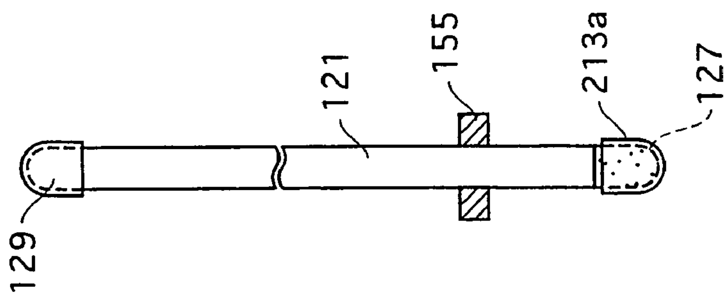

The attached solder 213 dries out and hardens, and as shown in FIG. 12B, a solder layer 213*a*, namely the shutoff layer 203 surrounding the external electrode 123 and the metal conductor 127 at the end of the glass bulb 121 is formed. After the glass bulb 121 is returned to the normal temperature, the glass bulb 121 is removed from the first retainer 155.

Even if the glass bulb obtained by the above-described process has cracks in the silver paste constituting the external electrode (123), or the silver paste has a porous structure and has voids (air) inside thereof, it is possible to prevent ozone from being generated in the external electrode 123 since the solder layer 213*a* (shutoff layer 203) shuts out the external electrode 123 from an outside air.

(2) Second Formation Process

Figure 12C:
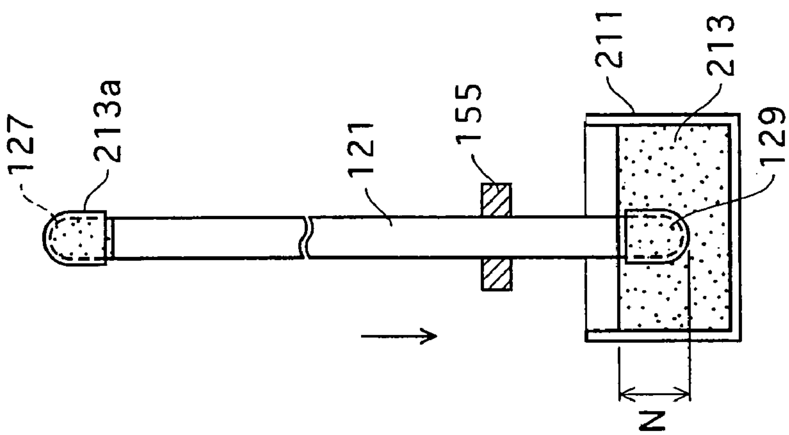
Figure 12D:
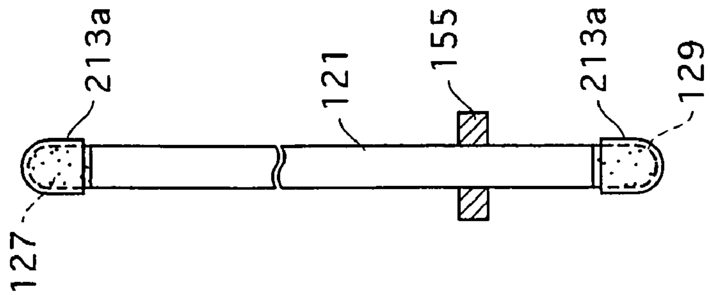

Next, as shown in FIG. 12C, the sealed glass bulb 121 is held by the first retainer 155 at a position between the other end and the center of the glass bulb 121, and the melted solder is attached to the other end of the glass bulb 121 by the dipping method. That is to say, as is the case with the first formation process, the glass bulb 121 is lowered such that the other end is immersed into the solder 213 in the container 211 by the predetermined length of N mm, and then pulled up so that the solder 213 is attached to the other end of the glass bulb 121.

The attached solder 213 dries out and hardens, and the solder layer 213*a*, namely the shutoff layer 203 surrounding the external electrode 125 and the metal conductor 129 at the other end of the glass bulb 121 is formed. After the glass bulb 121 is returned to the normal temperature, the glass bulb 121 is removed from the first retainer 155.

This completes the manufacturing of the lamp 201 in a shape of a straight tube. It should be noted here that the first retainer 155 used here is the same as the first retainer 155 used in Embodiment 1, but another retainer may be used instead.

Here, even if the glass bulb obtained by the above-described process has cracks in the silver paste constituting the external electrode (125), or the silver paste has a porous structure and has voids inside thereof, it is possible to prevent ozone from being generated in the external electrode 125 since the solder layer shuts out the external electrode 125 from an outside air.

Furthermore, in the formation of the shutoff layers 203 and 205, if there is, for example, a large gap (due to a crack or a void) between the surface of the external electrode 123 (125) and the inner surface of the metal conductor 127 (129), the solder 213 enters and fills the gap. This prevents the corona discharge from occurring in a space between the surface of the external electrode 123 (125) and the inner surface of the metal conductor 127 (129). The solder layer, surrounding and shutting out the external electrodes 123 and 125 from an outside air, further prevents ozone from being generated.

3. Acts and Effects

The following describes the acts and effects of the lamp 201.

The inventors of the present invention, through various studies, also found that the corona discharge occurs and ozone is generated in a space between the metal conductors and the glass bulb.

That is to say, in the conventional lamp 1, the external electrodes 11 and 13 are formed into the cylindrical shape near the ends of the glass bulb 3 as follows. The surface of the glass bulb 3, except for the portions on which the external electrodes 11 and 13 are to be formed, is masked by tape or the like, and the paste is applied to the target portion of the masked glass bulb by rotating the glass bulb, by the spray method or brush application method.

However, the conductive resin layers of the external electrodes 11 and 13 formed as described above by such methods have depressions and projections in the tube axis direction of the glass bulb 3 since the paste is applied unevenly. The conductive resin layers of the external electrodes 11 and 13 are then dried. The metal conductors 15 and 17 in the shape of character C having spring elasticity are then attached to the outer surface of the external electrodes 11 and 13. In this attachment, loads are applied in a concentrated manner to the largest projection among the projections of the conductive resin layers that are generated due to the unevenness of the applied paste. This may generate cracks C in the conductive resin layers, or may cause the conductive resin layers to have a porous structure having voids D inside thereof.

It is considered that when this happens, in portions of the conductive resin layers where there are cracks C or voids D, the inner surface of the metal conductors 15 and 17 and the external surface of the glass bulb 3 face each other directly with an air layer having distance “h” in between (in case a plurality of voids continue, a block of air is generated, and the block of air is referred to as “air layer”), causing the corona discharge to occur. Also, it is considered that although the above-mentioned air layer is covered with the metal conductors 15 and 17, the air layer may be connected to the cracks C or the like in the metal conductors 15 and 17 and further to the outside air though the cracks C or the like, leading to the occurrence of corona discharge and the generation of ozone.

In Embodiment 2 in which this problem has been taken into consideration, the lamp 201 is provided with the shutoff layers 203 and 205 that shut out the external electrodes 123 and 125 from an outside air by surrounding the external electrodes 123 and 125 or surrounding the external electrodes 123 and 125 and the metal conductors 127 and 129 that are both formed on the outer surface of the glass bulb 121 at both ends 121*b* thereof.

As described above, with this construction, even if the external electrodes 123 and 125 have cracks C in the conductive paste (in the present embodiment, silver paste) constituting the electrodes, or if the silver paste has a porous structure, or the gap with the distance “h” is generated between the metal conductor and the glass bulb as mentioned in “Description of the Related Art” (see FIG. 2C), it is possible to restrict the generation of ozone even if the corona discharge occurs between the glass bulb 121 and each of the metal conductors 127 and 129 during the lamp lighting. This is because the external electrodes 123 and 125 are shutout from an air outside the metal conductors 127 and 129 by the shutoff layers 203 and 205. From this point of view, it is suggested that to restrict the generation of ozone, the external electrodes are not necessarily be made from conductive paste, but may be made from conductive resin layers as in the conventional technology, in so far as the external electrodes are covered with the metal conductors, and exposed portions of the external electrodes that are not covered with the metal conductors are covered with the shutoff layers.

The above-described construction, which prevents ozone from being generated, makes it possible to provide a fluorescent lamp, backlight unit, and liquid crystal television that have external electrodes that can live approximately as long as the other parts thereof (these advantageous effects are referred to as “the thirteenth effect”).

When the shutoff layers 203 and 205 are formed as metal films, it is possible to form them with ease by the dipping method to cover the external electrodes 123 and 125 and the metal conductors 127 and 129, and it is possible to form them such that the metal conductors 127 and 129 are connected to the electrode sockets 113 and 115 (shown in FIG. 4) with ease. Also, the metal films (shutoff layers), which are formed to cover the metal conductors 127 and 129 and the external electrodes 123 and 125, fix the metal conductors 127 and 129 to the external electrodes 123 and 125. This prevents the metal conductors 127 and 129 from being removed from the external electrodes 123 and 125.

Also, by forming the shutoff layers 203 and 205 as metal films or insulating films such that part of the metal conductors 127 and 129 is exposed to the outside air, it is possible to reduce the amount of the material of the metal films or insulating films, compared with the case where the metal conductors 127 and 129 are covered with the shutoff layers 203 and 205 entirely (the entire exposed surface of the metal conductors 127 and 129 is covered).

Furthermore, the above-described acts and effects (corresponding to the first to the ninth effects) can be obtained by incorporating the constructions described in Embodiment 1 and Modifications 1 and 2, such as the positional relationships between the rims 127*a* and 129*a* of the metal conductors 127 and 129 and the rims 123*a* and 125*a* of the external electrodes 123 and 125, chamfering the rims 127*a* and 129*a* of the metal conductors 127 and 129, the slits 137 of the metal conductors 127 and 129, the external electrodes 123 and 125 made from silver paste, the low-melting-point glass contained in the silver paste and the like.

It is apparent from the above description that a lamp can prevent ozone from being generated by the corona discharge during lamp lighting even if the conductive resin layers of the external electrodes 11 and 13 have cracks C or the like if the lamp includes: a glass bulb that has a discharge space inside; external electrodes that are conductive layers covering the outer surface of the glass bulb at both ends thereof; metal members (metal conductors) that are respectively connected to the external electrodes by covering at least part of the external electrodes and are in a shape of a cap or a sleeve; and shutoff layers that cover (i) the external electrodes or (ii) the external electrodes and the metal members, such that the external electrodes are shut out from an outside air.

5. Modification to Embodiment 2

(1) Modification 3

Figure 13:
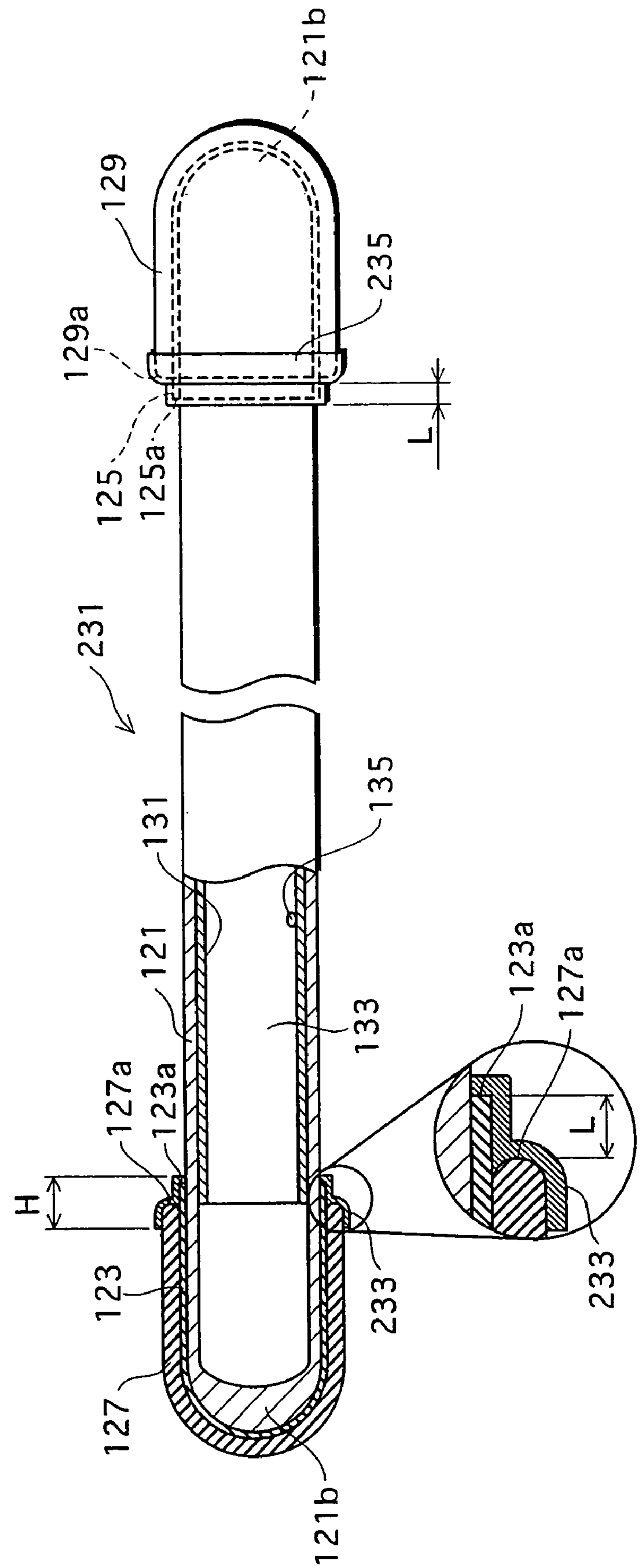
FIG. 13 shows an outline of a lamp 231 in Modification 3, a modification to Embodiment 2.

FIG. 13 shows an outline of a lamp 231 in Modification 3, a modification to Embodiment 2. Modification 3 differs from Embodiment 2 in that the shutoff layers are formed to cover only the portions of the external electrodes 123 and 125 that are exposed to the outside air.

Figure 11C:
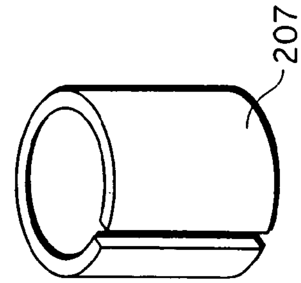
FIG. 11C shows an appearance of a metal conductor 207 as a different example.

That is to say, while in the lamp 201 of Embodiment 2, the shutoff layers. 203 and 205 cover the entire area G (see FIG. 11) of the external electrodes 123 and 125 and the metal conductors 127 and 129, in the lamp 231 of Modification 3, shutoff layers 233 and 235 are formed to cover the area H of the external electrodes 123 and 125 that is exposed to the outside air, as shown in FIG. 13. It should be noted here that in the case where the metal conductors 127 and 129 have the slits 137 as shown in FIG. 11B, it is preferable that shutoff layers are further formed to cover the portions that are connected to the outside air via the slits.

With the above-stated construction, as is the case with Embodiment 2, even if the silver paste constituting the external electrodes 123 and 125 has cracks, or the silver paste has a porous structure, it is possible to prevent ozone from being generated in the external electrodes 123 and 125 since the shutoff layers 233 and 235 shut out the external electrodes 123 and 125 from the outside air.

Also, Modification 3 reduces the amount of the material of the shutoff layers 203 and 205, compared with Embodiment 2.

Figure 4:
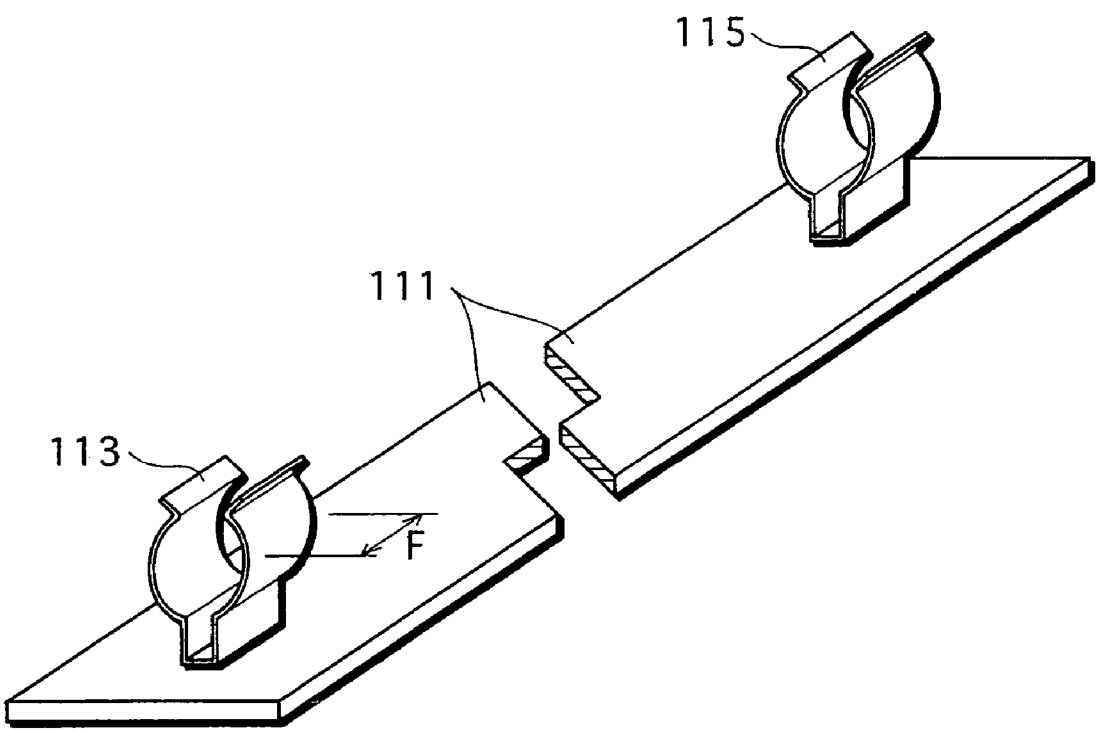
FIG. 4 shows an outline of a socket board 111 in Embodiment 1.

The material of the shutoff layers 233 and 235 may be different from that used in Embodiment 2. In Embodiment 2, the conductivity with the electrode sockets 113 and 115 shown in FIG. 4 is taken into consideration since the entire area G is covered with the shutoff layers, and the shutoff layers 203 and 205 are metal films made of solder, nickel plate, gold plate, silver plate, copper plate or the like. On the other hand, in Modification 3 in which only the area H is covered with the shutoff layers 233 and 235, the metal conductors 127 and 129 excluding the area H are connected to the electrode sockets 113 and 115 shown in FIG. 4. Accordingly, the shutoff layers 233 and 235 may be made from insulating tape, or may be insulating films that are continuous films made of at least one metal oxide that is selected from a group consisting of silicon oxide, alumina oxide, hafnium oxide, zirconium oxide, vanadium oxide, niobium oxide, and yttrium oxide, as well as the above-listed metal films.

(2) Modification 4

Figure 14:
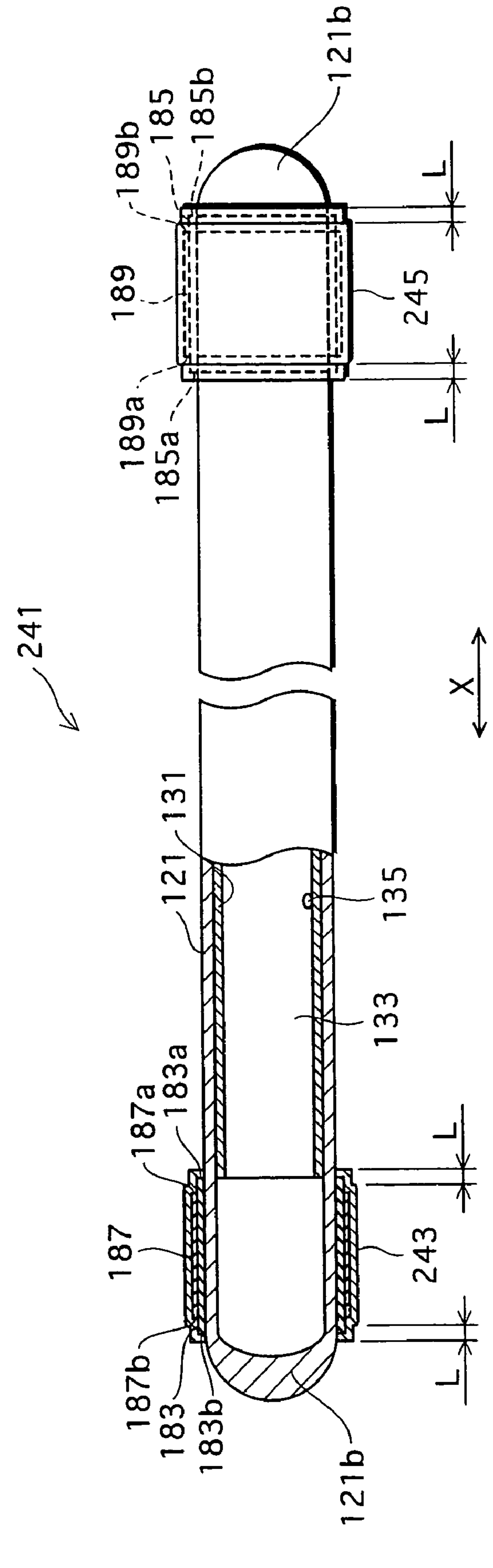
FIG. 14 shows an outline of a lamp 241 in Modification 4, a modification to Embodiment 2.

FIG. 14 shows an outline of the lamp 241 of Modification 4, a modification to Embodiment 2. Modification 4 differs from Modification 3 in that: (a) external electrodes 183 and 185 are formed into a cylindrical shape by the dipping method; (b) metal conductors 187 and 189 are formed into a shape of a sleeve (cylinder), are inserted into the glass bulb 121 from the ends 121*b* by a heat-fitting method, and are firmly connected to the external electrodes 183 and 185; (c) ends 187*a* and 187*b* of the metal conductor 187 (ends 189*a* and 189*b* of the metal conductor 189) recede from ends 183*a* and 183*b* of the external electrodes 183 (ends 185*a* and 185*b* of the external electrodes 185) toward the center of the external electrodes 183 (185) by a distance L, respectively; and (d) solder (shutoff layers 243 and 245) is wound around the external electrodes 183 and 185 and the metal conductors 187 and 189 into a cylindrical shape by the dipping method as shown in FIG. 12. The reason why the shutoff layers 243 and 245 are formed into a cylindrical shape is that the adhesiveness of the solder to the outer surface of the glass bulb 121 is improved.

In the following description, the same components as those of the lamp 201 in Embodiment 2 or the lamp 231 in Modification 3 are assigned the same numbers and the description thereof is omitted.

Modification 4, as is the case with Embodiment 2, provides the above-described thirteenth effect. This is because even if the external electrodes 123 and 125 have cracks C in the conductive paste (in the present case, silver paste) constituting the electrodes, or if the silver paste has a porous structure, or the gap with the distance "h" is generated between the metal conductor and the glass bulb as mentioned in "Description of the Related Art" (see FIG. 2C), the cracks C or the like in the external electrodes 123 and 125 are shut out from an air outside the metal conductors 127 and 129 by shutoff layers 243 and 245 that cover the external electrodes 183 and 185 and the metal conductors 187 and 189.

(3) Modification 5

Figure 15B:
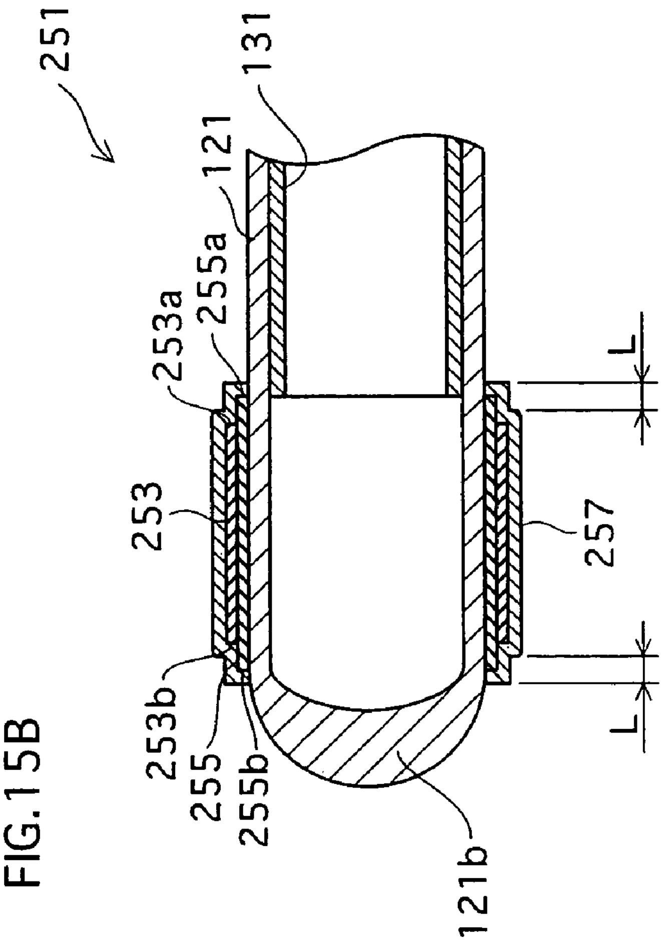
FIG. 15B shows an outline of the lamp 251.
Figure 15A:
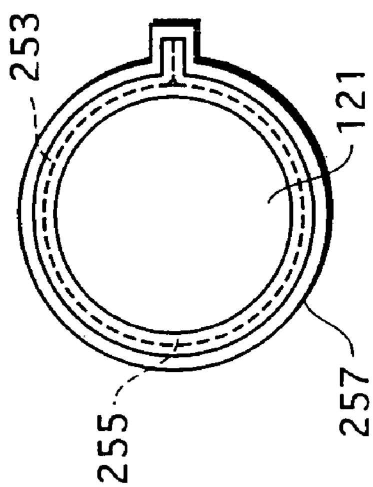
FIG. 15A is a side view of a lamp 251 in Modification 5, a modification to Embodiment 2.

FIG. 15A is a side view of a lamp 251 in Modification 5, a modification to Embodiment 2. FIG. 15B shows an outline of the lamp 251.

Modification 5 differs from Modification 2 in that a thin member is formed into a shape of a sleeve by winding a metal conductor 253 around an external electrode 255, putting ends of the wound-around metal conductor 253, and crushing the put-together ends.

The metal conductor 253 is the same as a metal conductor provided in the opposite end (not illustrated). In the following description, the same components as those of the lamp 201 in Embodiment 2, those of the lamp 231 in Modification 3, or those of the lamp 241 in Modification 4 are assigned the same numbers and the description thereof is omitted.

With the stated construction, Modification 5, as is the case with Embodiment 2, can prevent ozone from being generated by the corona discharge during lamp lighting. This is because even if the external electrode 255 has cracks C in the conductive paste (in the present case, silver paste) constituting the electrode, or if the silver paste has a porous structure, or if the gap with the distance "h" is generated between the metal conductor and the glass bulb as mentioned in "Description of the Related Art" (see FIG. 12), the cracks C or the like in the external electrode 255 are shut out from an air outside the metal conductor 253 by shutoff layer 257 that covers the external electrode 255 and the metal conductor 253.

(4) Combinations

The external electrodes and the metal conductors provided at both ends of the glass bulb 121 may not necessarily be in the same shape, but may be in any combination of shapes selected from Embodiment 2 and Modifications 3-5. Also, the construction of the metal conductor is not limited to those shown in Embodiment 2 and Modifications 3 and 4. For example, the metal conductors may be in a shape of a sleeve, such as the metal conductor 207 shown in FIG. 11C, with slits extending in the tube axis direction, instead of the shape of a cap such as the metal conductor 127 in Embodiment 2 (see FIG. 13).

(5) Shape of Glass Bulb

In Embodiment 2 and Modifications 3-5, the glass bulb 121 is circular in the transverse section. However, not limited to this, the glass bulb 121 may be, for example, elliptical (see Embodiment 3) in the transverse section.

(6) Acts and Effects

The lamps of Modifications 3-5 are obtained by providing the lamp of Embodiment 1 (or Modification 1 or 2) with the shutoff layers, and the acts and effects of the shutoff layers have been explained earlier. It should be noted further that the same acts and effects (corresponding to the first to the ninth effects) can be obtained by incorporating the constructions described in Embodiment 1 and Modifications 1 and 2, such as the positional relationships between the rims 127*a* and 129*a* of the metal conductors 127 and 129 and the rims 123*a* and 125*a* of the external electrodes 123 and 125, chamfering the rims 127*a* and 129*a* of the metal conductors 127 and 129, the slits 137 of the metal conductors 127 and 129, the external electrodes 123 and 125 made from silver paste, the low-melting-point glass contained in the silver paste and the like.

Embodiment 3

In Embodiments 1 and 2 and Modifications 1-5, the glass bulb 121 is circular in the transverse section. However, not limited to this, the glass bulb 121 may be in other shapes.

In Embodiment 3, the glass bulb 121 is flat (in this example, elliptical) in the transverse section, as described in the following.

Figures 16A, 16B, 16C, 16D, 16E:
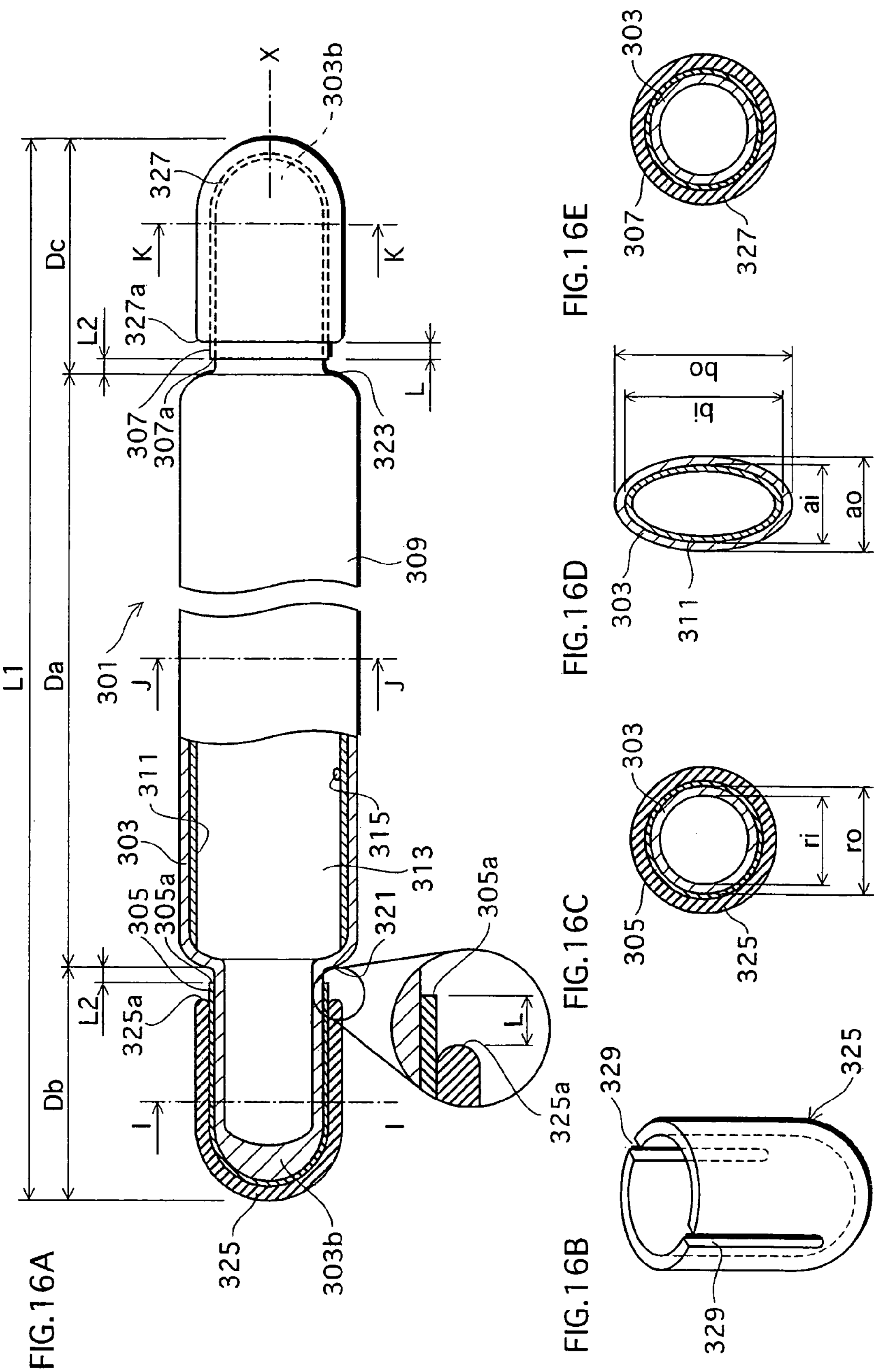
FIG. 16A shows an outline of a lamp 301 in Embodiment 3 of the present invention.
FIG. 16B shows an appearance of a metal conductor 325 in Embodiment 3.
FIG. 16C is a cross section that is taken along the line I-I shown in FIG. 16A and is viewed from a direction indicated by the arrow by the line I-I.
FIG. 16D is a cross section that is taken along the line J-J shown in FIG. 16A and is viewed from a direction indicated by the arrow by the line J-J.
FIG. 16E is a cross section that is taken along the line K-K shown in FIG. 16A and is viewed from a direction indicated by the arrow by the line K-K.

FIG. 16A shows an outline of the lamp 301 in Embodiment 3 of the present invention.

As shown in FIG. 16A, the lamp 301 in Embodiment 3 of the present invention is provided with a glass bulb 303 that is a discharge vessel in a cylindrical shape, and external electrodes 305 and 307 that are formed on the outer surface of the glass bulb 303 at both ends 303*b* thereof. A light extraction portion 309 that is in the middle of the glass bulb 303 is flat in the transverse section.

The glass bulb 303 is made of, for examples borosilicate glass, and as is the case with Embodiment 1, a phosphor layer 311 is formed on the inner surface of the glass bulb 303, and the inside of the glass bulb 303 is filled with a rare gas 313 and mercury 315.

FIG. 16C is a cross section that is taken along the line I-I shown in FIG. 16A and is viewed from a direction indicated by the arrow by the line I-I. FIG. 16D is a cross section that is taken along the line J-J shown in FIG. 16A and is viewed from a direction indicated by the arrow by the line J-J. FIG. 16E is a cross section that is taken along the line K-K shown in FIG. 16A and is viewed from a direction indicated by the arrow by the line K-K.

As shown in FIGS. 16C-16E, a positive column emitting portion 309 (the light extraction portion 309) of the glass bulb 303 is substantially elliptical in the transverse section. The external electrodes 305 and 307 are substantially circular in the transverse section.

Here, an example of measurement of the lamp 301 is provided. An overall length L1 of the lamp 301 is 715 mm. A length Da of the positive column light emitting portion 309 (light extraction portion 309) along a tube axis X is approximately 680 mm. Lengths Db and Dc of the ends 303*b* of the glass bulb 303 on which the external electrodes 305 and 307 are formed are approximately 17 mm, respectively, along the tube axis X. An outer surface area of the positive column light emitting portion 309 is approximately 327 $cm^2$.

In regards with the portion that is substantially elliptical in the transverse section, as shown in FIG. 16D, a minimum outer diameter ao is 4.0 mm, a minimum inner diameter ai is 3.0 mm, a maximum outer diameter bo is 5.8 mm, and a maximum inner diameter bi is 4.8 mm. Also, in regards with the portion that is substantially circular in the transverse section, an outer diameter ro is 5.0 mm, and an inner diameter ri is 4.0 mm.

The external electrodes 305 and 307 are formed by applying conductive paste (for example, silver paste) to the outer surface of the glass bulb 303 at both ends thereof that are in the cylindrical shape. The external electrodes 305 and 307 are formed such that there is a distance L2 of 1 mm or more between an end 321 (323) of the flat portion of the glass bulb 303 and a rim 305*a* (307*a*) of the external electrode 305 (307) that face each other.

The inventors of the present invention, through various studies, also found that the corona discharge occurs in a gap with the distance L2 depending on the positions where the rims 305*a* and 307*a* of the external electrodes 305 and 307, which respectively face the ends 321 and 323 of the flat portion of the glass bulb 303, are attached, during a lamp lighting in which a high voltage of 1.0 kV to 3.0 kV is applied to between the external electrodes 305 and 307.

That is to say, as shown in FIG. 16A, if the distance L2 becomes as small as less than 1 mm, the corona discharge occurs and ozone is generated in a space between the rim 305*a* (307*a*) of the external electrode 305 (307) and the end 321 (323) of the flat portion of the glass bulb 303 that directly face each other.

The generation of ozone may lead to the problems described in "Description of the Related Art". FIG. 16B shows an appearance of a metal conductor 325 in Embodiment 3.

As shown in FIG. 16B, the metal conductor 325 is the same as the metal conductor 327, and is the same as the metal conductors used in Embodiments 1 and 2 in the material, shape (including the chamfering), presence of slits, method of attaching it to the glass bulb or the like. However, the metal conductor 325 may be made of other materials such as those described in Embodiments 1 and 2.

In the present embodiment, the metal conductors 325 and 327 may have, for example, the overall length of 14.0 mm, the outer diameter on the cylindrical portion being 5.5 mm, the inner diameter 5.1 mm, and the thickness 0.2 mm. Here, since the outer diameter of the glass bulb 303 is 5.0 mm and the inner diameter of the metal conductors 325 and 327 is 5.1 mm, a distance of a gap between the glass bulb 303 and the metal conductor 325 and the metal conductor 327 is 0.05 mm in average.

The external electrodes 305 and 307 are formed by applying conductive paste (for example, silver paste) to both ends of the sealed glass bulb 303 by the dipping method, which has been explained in Embodiments 1 and 2, to have a predetermined length of, for example, 15.5 mm.

It should be noted here that the conductive paste for the external electrodes 305 and 307 is not limited to silver paste, but may be other pastes explained in Embodiment 1. Also, the conductive paste may contain the low-melting-point glass explained in Embodiment 1.

2. Manufacturing Method

FIGS. 17A-17D show how the glass bulb 303 of the lamp 301 is formed.

(1) Preparation Process

Figure 17A:
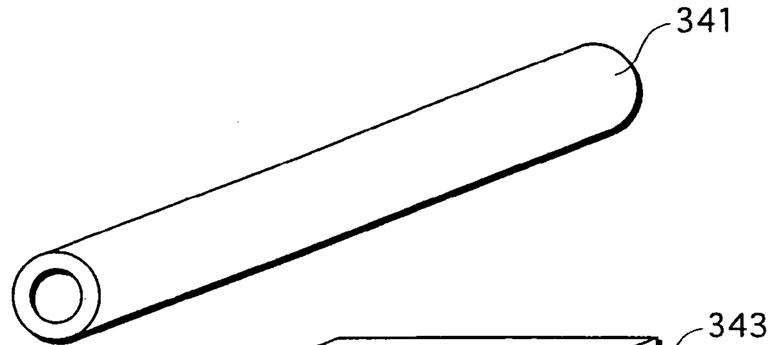
FIGS. 17A-17D show how the glass bulb 303 of the lamp 301 is formed.
Figure 17B:
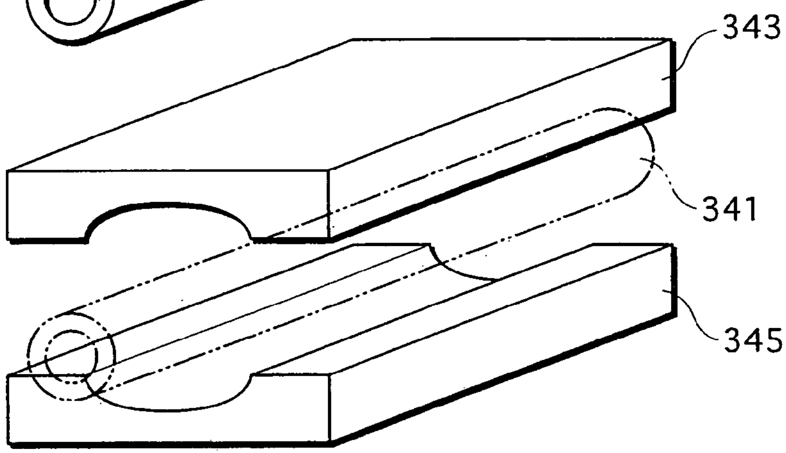

As shown in FIG. 17A, a straight glass tube 341 made of borosilicate glass (the softening point is 765° C.) is prepared. As shown in FIG. 17B, a pair of jig plates 343 and 345 for forming the positive column emitting portion 309 of the glass bulb 301 is prepared. It should be noted here that the pair of jig plates 343 and 345 is made of, for example, stainless steel, and has depressions that are in a shape of an ellipse that corresponds to the outer elliptical shape of positive column emitting portion 309 of the glass bulb 301.

(2) Setting Process

The straight glass tube 341 prepared in the above preparation process is set so that a portion thereof, which is to be flattened into a flat shape in the transverse section, is sandwiched by the jig plates 343 and 345 (as indicated by the chain double-dashed line in FIG. 17B).

(3) Formation Process

Figure 17C:
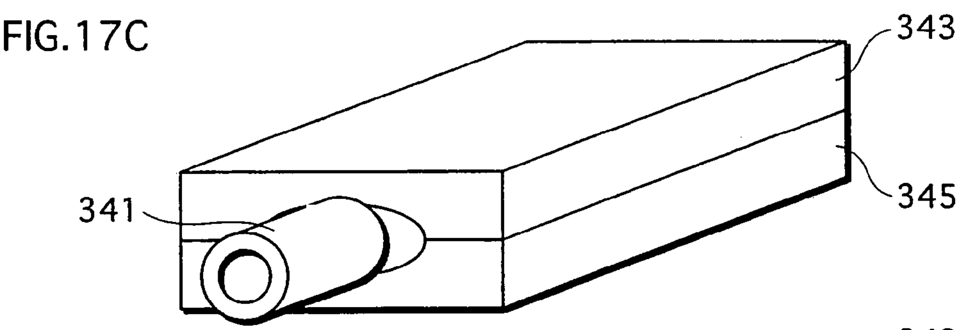
Figure 17D:
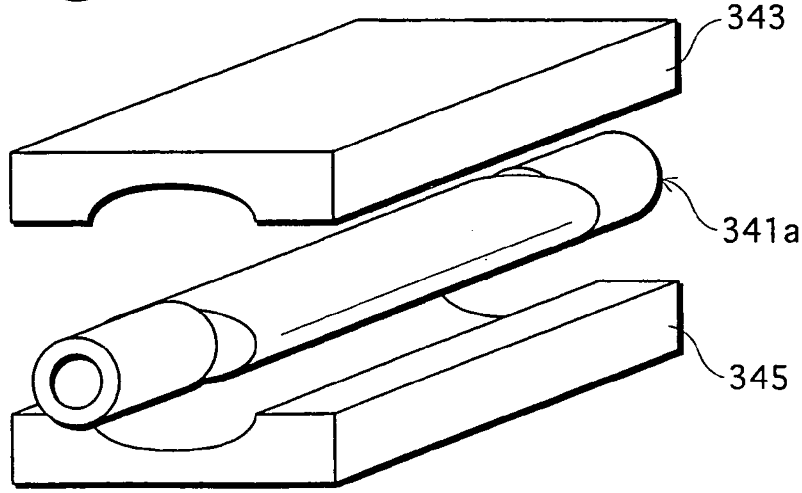

As shown in FIG. 17C, the glass tube 341 is heated by a heating furnace (not illustrated) to a tube temperature (for example, a temperature in a range from 620° C. to 700° C.) lower than the softening point, so that the sandwiched portion is flattened by the weight of the jig plate 343. As shown in FIG. 17D, by removing the jig plates 343 and 345, obtained is the glass tube 341 whose specific portion having been deformed as desired from an approximate circle to an approximate ellipse in the transverse cross section.

The method of forming the glass bulb is not limited to the above-described method.

(4) Others

The glass bulb 303 of the present embodiment is formed by subjecting the straight glass tube 341 to the above-described processes (1) to (3). Through these processes, the shape, in the transverse cross section, of an approximate circle with the outer diameter of 5.0 mm and the inner diameter of 4.0 mm is changed to an approximate ellipse with the maximum outer diameter of 5.8 mm, the minimum outer diameter of 4.0 mm, the minimum inner diameter of 3.0 mm, and the maximum inner diameter of 4.8 mm.

It should be noted here that in the case of flattening the straight glass tube 341 with the outer diameter of 5.0 mm by the above-described formation method, it is desirable that the settings are made so that in the deformed glass bulb, the maximum outer diameter bo is 6.6 mm and the minimum outer diameter ao is 3.0 mm at the largest (the ellipticity in this case is $ao/bo \approx 0.45$). This is because if the tube is excessively flattened, the tube greatly changes in thickness, decreasing the yield.

3. Acts and Effects

The following describes the acts and effects of the lamp 301.

Lamps with a flat discharge vessel are effective in thinning the LCBL unit or expanding the light radiation area. However, conventional lamps have a problem that they require a high cathode fall voltage and thus the lamp power increases. This is because in the conventional lamps, the external electrodes are disposed on a portion of the glass bulb that is flat in the transverse section. Compared with the glass bulb that is circular in the transverse section and is the prototype of the flat-shape glass bulb, it requires a higher cathode fall voltage to obtain a predetermined lamp current.

Also, when the external electrodes are formed using a metal as the material, elliptical external electrodes are lower than circular external electrodes in measurement accuracy. As a result, in the case of the elliptical external electrodes, a gap may be generated between the inner surface of the external electrodes and the outer surface of the glass bulb, the corona discharge may occur in the gap during lamp lighting, and ozone may be generated.

With the above-described problem taken into consideration, in Embodiment 3, the external electrodes 305 and 307 are provided on the ends 303*b* of the glass bulb 303 that are in the cylindrical shape. With this construction, it is possible to restrict the reduction in the light-emission efficiency of the lamp 301, and it is possible to prevent a gap from being generated between the outer surface of the glass bulb 303 and the inner surface of each of the external electrodes 305 and 307, thus restricting the generation of ozone.

Also, the external electrodes 305 and 307 are formed such that there is the distance L2 between the end 321 (323) of the flat portion of the glass bulb 303 and the rim 305*a* (307*a*) of the external electrode 305 (307) that face each other. This construction prevents the corona discharge from occurring in the gap between the end 321 (323) of the flat portion of the glass bulb 303 and the rim 305*a* (307*a*) of the external electrode 305 (307), thus restricting the generation of ozone (these advantageous effects are referred to as "the fourteenth effect").

Also, with the distance L2 being set to 1 mm or more, even if there are variations in the positions at which the external electrodes 305 and 307 are attached, it is possible to prevent the corona discharge from occurring in the gap between the end 321 (323) of the flat portion of the glass bulb 303 and the rim 305*a* (307*a*) of the external electrode 305 (307). Furthermore, with the distance L2 being set to as small as 1 mm, it is possible to reduce the overall length of the lamp (these advantageous effects are referred to as "the fifteenth effect").

As apparent from the above description, a lamp having a discharge vessel in a flat shape can prevent the reduction in the light-emission efficiency of the lamp (lamp efficiency) and prevent the corona discharge from occurring if the lamp includes: a glass bulb that has a discharge space therein; external electrodes each of which covers an outer surface of the glass bulb at an end thereof, where a light extraction portion of the glass bulb positioned in the middle thereof is in a flat shape in the transverse section.

Furthermore, the above-described acts and effects (corresponding to the first to the ninth and the tenth to thirteenth effects) can be obtained by incorporating the constructions described in Embodiments 1 and 2 and Modifications 1 to 5, such as the positional relationships between the rims 325*a* and 327*a* of the metal conductors 325 and 327 and the rims 305*a* and 307*a* of the external electrodes 305 and 307, chamfering the rims 325*a* and 327*a* of the metal conductors 325 and 327, the slits 329 of the metal conductors 325 and 327, the external electrodes 305 and 307 made from silver paste, the low-melting-point glass contained in the silver paste and the like.

5. Modification to Embodiment 3

(1) Modification 6

Figure 18:
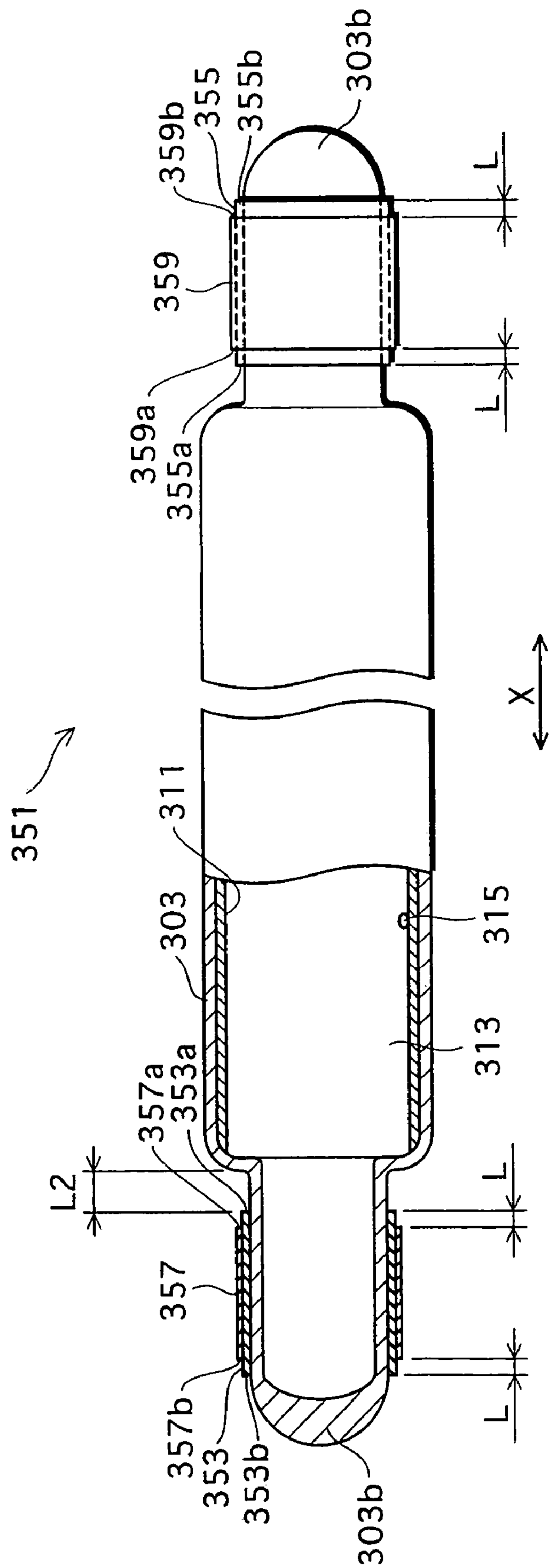
FIG. 18 shows an outline of a lamp 351 in Modification 6, a modification to Embodiment 3.

FIG. 18 shows an outline of a lamp 351 in Modification 6, a modification to Embodiment 3. Modification 6 differs from Embodiment 3 in the following points: (a) external electrodes 353 and 355 are formed from silver paste into a cylindrical shape by the dipping method; (b) metal conductors 357 and 359, which are made of a material that has substantially the same thermal expansion coefficient as the glass bulb, are formed into a shape of a sleeve (cylinder), are inserted into the glass bulb 303 from the ends 303*b* by a heat-fitting method, and are firmly connected to the external electrodes 353 and 355; and (c) ends 357*a* and 357*b* of the metal conductor 357 (ends 359*a* and 359*b* of the metal conductor 359) recede from ends 353*a* and 353*b* of the external electrode 353 (ends 355*a* and 355*b* of the external electrode 355) toward the center of the external electrode 353 (355) by a distance L, respectively.

In the following description, the same components as those of the lamp 301 in Embodiment 3 are assigned the same numbers and the description thereof is omitted.

In Modification 6, as is the case with Embodiment 3, the external electrodes 353 and 355 are provided on the ends 303*b* of the glass bulb 303 that are in the cylindrical shape. With this construction, it is possible to restrict the reduction in the light-emission efficiency of the lamp 351, and it is possible to prevent a gap from being generated between the outer surface of the glass bulb 303 and the inner surface of each of the external electrodes 353 and 355, thus restricting the generation of ozone.

Also, if, as is the case with Embodiment 3, the external electrodes 353 and 355 are formed such that there is the distance L2 between the end of the flat portion of the glass bulb 303 and the rim 353*a* (355*a*) of the external electrode 353 (355) that face each other, the above-described fourteenth and fifteenth effects can be obtained.

(2) Modification 7

Figure 19B:
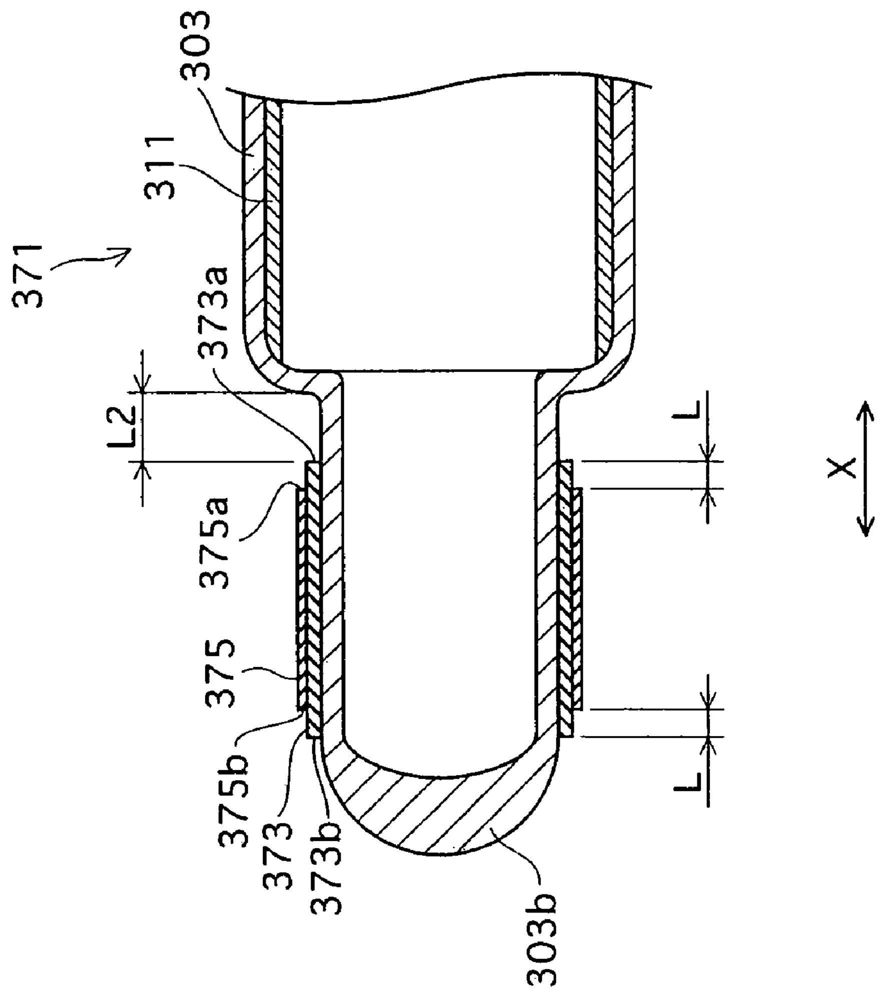
FIG. 19B shows an outline of the lamp 371.
Figure 19A:
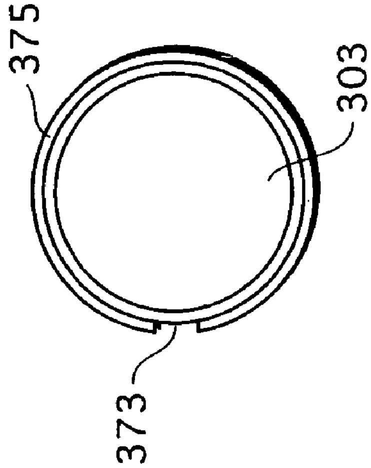
FIG. 19A is a side view of a lamp 371 in Modification 7, a modification to Embodiment 3.

FIG. 19A is a side view of a lamp 371 in Modification 7, a modification to Embodiment 3. FIG. 19B shows an outline of the lamp 371.

Modification 7 differs from Modification 6 in that a metal conductor 375, being a thin member, is wound around an external electrode 373 into a shape of a sleeve that has an elastic force applied in a direction that decreases a gap between two ends of the wound-around thin member (a direction that decreases the diameter of the metal conductor 375). The metal conductor 375 is the same as a metal conductor provided in the opposite end (not illustrated). In the following description, the same components as those of the lamp 301 in Embodiment 3 or those of the lamp 351 in Modification 6 are assigned the same numbers and the description thereof is omitted.

With the stated construction of Modification 7 in which, as is the case with Embodiment 3 and Modification 6, the external electrodes (373 and a not-illustrated one) are provided on the ends 303*b* of the glass bulb 303 that are in the cylindrical shape, it is possible to restrict the reduction in the light-emission efficiency of the lamp 371, and it is possible to prevent a gap from being generated between the outer surface of the glass bulb 303 and the inner surface of each of the external electrodes (373 and a not-illustrated one), thus restricting the generation of ozone.

Also, if, as is the case with Embodiment 3, the external electrodes (373 and a not-illustrated one) are formed such that there is the distance L2 between the end of the flat portion of the glass bulb 303 and the rim 373*a* (the other rim) of the external electrode 373 (not-illustrated) that face each other, the above-described fourteenth and fifteenth effects can be obtained.

(3) Others

The external electrodes and the metal conductors provided at both ends of the glass bulb 303 may not necessarily be in the same shape, but may be in any combination of shapes selected from Embodiment 3 and Modifications 6 and 7.

(4) Acts and Effects

The lamps of Modifications 6 and 7 are obtained by providing the lamp of Embodiment 1 (or Modification 1 or 2) with a flat shape positive column emitting portion as a portion of the glass bulb 121, and the acts and effects of the flat shape positive column emitting portion have been explained earlier.

It should be noted further that the same acts and effects (corresponding to the first to the ninth effects) can be obtained by incorporating the constructions described in Embodiment 1 and Modifications 1 and 2, such as the positional relationships between the rims 127*a* and 129*a* of the metal conductors 127 and 129 and the rims 123*a* and 125*a* of the external electrodes 123 and 125, chamfering the rims 127*a* and 129*a* of the metal conductors 127 and 129, the slits 137 of the metal conductors 127 and 129, the external electrodes 123 and 125 made from silver paste, the low-melting-point glass contained in the silver paste and the like.

Supplemental Note

The lamp of the present invention has been described through Embodiments 1-3 and Modifications 1-7. The lamp of the present invention, however, may also be achieved by combining the constructions described in Embodiments 1-3 and Modifications 1-7. Also, the present invention can be applied to any display apparatuses that include the backlight units, not limited to the liquid crystal televisions.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A fluorescent lamp, for removable mounting in electrode sockets of a fixture for providing power to the fluorescent lamp, comprising:

a glass bulb that is in a shape of a tube and has a discharge space therein;

external electrodes that are conductive layers each of which covers an outer surface of the glass bulb at an end; and cylindrical or cap-shaped metal members that are permanently mounted on and connected to the external electrodes to cover at least part of the external electrodes and configured to permit removable electrical connections to the electrode sockets, wherein the metal members are formed such that ends of each metal member recede from ends of each corresponding external electrode toward a center of each corresponding external electrode.

2. The fluorescent lamp of claim 1, wherein the metal members are formed such that rims of the metal members recede from a center of the glass bulb more than rims of the external electrodes in a tube axis direction.

3. The fluorescent lamp of claim 1, wherein the conductive layers are made from a conductive paste.

4. The fluorescent lamp of claim 1 further comprising shutoff layers that cover (i) the external electrodes or, (ii) the external electrodes and the metal members, such that the external electrodes are shut out from an outside air.

5. The fluorescent lamp of claim 1, wherein a light extraction portion of the glass bulb positioned in a middle thereof is in a flat shape in a transverse section.

6. The fluorescent lamp of claim 2, wherein the rims of the metal members recede from the center of the glass bulb 1 mm or more than the rims of the external electrodes in the tube axis direction.

7. The fluorescent lamp of claim 1, wherein the metal members are respectively connected to the external electrodes by covering the external electrodes by 3 mm or more in length.

8. The fluorescent lamp of claim 1, wherein the rims of the metal members are chamfered.

9. The fluorescent lamp of claim 3, wherein the metal members are formed into at shape of a sleeve by winding a thin material, around the external electrodes, putting ends of the wound-around thin material together, and crushing the put-together ends.

10. The fluorescent lamp of claim 2, wherein the metal members are in a shape of either a sleeve or a cap, and the metal members are inserted into the glass bulb from the ends thereof by a heat-fitting method, and the metal members are connected to the external electrodes.

11. The fluorescent lamp of claim 2, wherein the metal members are in a shape of a cap, and the metal members have slits that extend in a longitudinal direction such that the metal members are connected firmly to the external electrodes by an elastic force of the metal members when the metal members are attached to the external electrodes.

12. The fluorescent lamp of claim 1, wherein the conductive layers are made of a material selected from a group that consists of a silver paste, a nickel paste, a gold paste, a palladium paste, and a carbon paste.

13. The fluorescent lamp of claim 11, wherein the conductive layers contain 1% by weight or more of a low-melting-point glass.

14. The fluorescent lamp of claim 4, wherein the ends of the glass bulb, excluding a light extraction portion, are substantially in a circular shape in a transverse section, and the external electrodes are disposed on an outer surface of the glass bulb at the ends that are substantially in the circular shape in the transverse section, such that there is a distance between one of the rims of the external electrodes and one end of the light extraction portion that face each other in a tube axis direction of the glass bulb, for each pair of one rim of the external electrodes and one end of the light extraction portion that face each other.

15. The fluorescent lamp of claim 4, wherein the shutoff layers are formed by a metal film.

16. The fluorescent lamp of claim 4, wherein the shutoff layers are formed as metal films or insulating films such that part of the metal members is exposed to the outside air.

17. A direct-below-type backlight unit for use in a liquid crystal television, comprising:

a plurality of fluorescent lamps among which one or more are the fluorescent lamp recited in claim 1; and one high-frequency electronic ballast that lights all of the plurality of fluorescent lamps.

18. A liquid crystal television which comprises the backlight unit recited in claim 17.

19. The fluorescent lamp of claim 1, wherein each metal member comprises a cylindrical shaped metal member having a solid surface.

20. A fluorescent lamp, for removable mounting in electrode sockets of a fixture for providing power to the fluorescent lamp, comprising:

a glass bulb that is in a shape of a tube and has a discharge space therein;

external electrodes that are conductive layers each of which covers an outer surface of the glass bulb at an end; and means for inhibiting a corona discharge including a cylindrical or cap-shaped metal member permanently mounted on and connected to the external electrode and configured to permit removable electrical connections to the electrode socket.

* * * * *